US008412081B2

(12) United States Patent
Kudo et al.

(10) Patent No.: US 8,412,081 B2

(45) Date of Patent: Apr. 2, 2013

(54) BELT MEANDERING PREVENTING DEVICE AND IMAGE FORMING APPARATUS INCLUDING THE SAME

(75) Inventors: Koichi Kudo, Kanagawa (JP); Takashi Hodoshima, Kanagawa (JP); Yuichi Hirose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 324 days.

(21) Appl. No.: 12/926,247

(22) Filed: Nov. 4, 2010

(65) Prior Publication Data

US 2011/0123237 A1 May 26, 2011

(30) Foreign Application Priority Data

Nov. 20, 2009 (JP) ................................ 2009-264549
Jun. 8, 2010 (JP) ................................ 2010-131386

(51) Int. Cl.
*G03G 15/01* (2006.01)
*B65G 43/00* (2006.01)
*F16H 7/22* (2006.01)

(52) U.S. Cl. .................... 399/302; 198/810.03; 474/106

(58) Field of Classification Search .................. 399/121, 399/165, 301, 302, 308; 198/810.03; 474/106, 474/107

See application file for complete search history.

(56) References Cited

U.S. PATENT DOCUMENTS 4,462,676 A * 7/1984 Shimura et al. ............... 399/165
5,182,601 A 1/1993 Hodoshima et al.
5,574,558 A 11/1996 Kudo et al.
5,815,784 A 9/1998 Kasahara et al.
6,112,046 A 8/2000 Suzuki et al.
6,252,682 B1 6/2001 Baba et al.
6,816,178 B2 11/2004 Yamada et al.
6,842,602 B2 1/2005 Kudo
6,925,279 B2 8/2005 Kamoshita et al.
6,947,693 B2 9/2005 Kamiya et al.
7,174,237 B2 2/2007 Takayama et al.
7,286,779 B2 * 10/2007 Kawagoe ........................ 399/66
7,343,127 B2 3/2008 Yamada et al.
7,379,683 B2 5/2008 Kamiya et al.
7,435,946 B2 10/2008 Kudo et al.
7,526,230 B2 4/2009 Kudo et al.
7,532,370 B2 5/2009 Kudo et al.
7,659,996 B2 2/2010 Kudo et al.
7,668,491 B2 * 2/2010 Furuya et al. ................. 399/302

(Continued)

FOREIGN PATENT DOCUMENTS

JP 2005-338522 12/2005
JP 2008-275800 11/2008

*Primary Examiner* — David Gray
*Assistant Examiner* — Gregory H Curran
(74) *Attorney, Agent, or Firm* — Harness, Dickey & Pierce, P.L.C.

(57) ABSTRACT

A belt meandering preventing device includes a belt displacement detection unit detecting the amount of displacement in a belt width direction of an endless belt rotatably stretched over support parts; and a belt meandering correction unit correcting the displacement in the belt width direction of the endless belt based on the amount of displacement detected by the belt displacement detection unit. The belt displacement detection unit includes a moving part moving in association with the displacement of the endless belt or an edge of the endless belt in the belt width direction and optical sensors outputting signals with output levels corresponding to the proportions of the moving part in optical paths of the optical sensors. The optical sensors are arranged such that the output levels of the optical sensors change as the endless belt is displaced in the belt width direction in a predetermined high-resolution detection range.

16 Claims, 22 Drawing Sheets

U.S. PATENT DOCUMENTS

| | | | |
|---|---|---|---|
| 2003/0223786 | A1 | 12/2003 | Kamoshita et al. |
| 2004/0022557 | A1 | 2/2004 | Kudo |
| 2005/0137745 | A1 | 6/2005 | Takayama et al. |
| 2006/0002739 | A1 | 1/2006 | Kudo et al. |
| 2006/0002748 | A1 | 1/2006 | Kudo et al. |
| 2006/0116228 | A1 | 6/2006 | Kamiya et al. |
| 2006/0120740 | A1 | 6/2006 | Yamada et al. |
| 2007/0086679 | A1 | 4/2007 | Kudo et al. |
| 2007/0108376 | A1 | 5/2007 | Kudo et al. |
| 2008/0047157 | A1 | 2/2008 | Takayama et al. |
| 2008/0106747 | A1 | 5/2008 | Kudo et al. |
| 2008/0174791 | A1 | 7/2008 | Kudo |
| 2008/0175612 | A1 | 7/2008 | Oikawa et al. |
| 2008/0213009 | A1 | 9/2008 | Kamoshita et al. |
| 2008/0232880 | A1 | 9/2008 | Noguchi et al. |
| 2008/0267673 | A1 | 10/2008 | Tao et al. |
| 2008/0303202 | A1 | 12/2008 | Noguchi et al. |
| 2009/0060605 | A1 | 3/2009 | Ohkushi et al. |
| 2009/0060613 | A1 | 3/2009 | Matsuda et al. |
| 2009/0116860 | A1 | 5/2009 | Hoshino et al. |
| 2009/0148185 | A1 | 6/2009 | Kudo et al. |
| 2009/0162118 | A1 | 6/2009 | Noguchi et al. |
| 2009/0207461 | A1 | 8/2009 | Hodoshima et al. |
| 2009/0212488 | A1 | 8/2009 | Hashimoto et al. |
| 2009/0212491 | A1 | 8/2009 | Noguchi et al. |
| 2009/0220277 | A1 | 9/2009 | Andoh et al. |
| 2009/0234498 | A1 | 9/2009 | Takahashi et al. |
| 2009/0324262 | A1 | 12/2009 | Matsuda et al. |
| 2010/0017019 | A1 | 1/2010 | Andoh et al. |
| 2010/0046991 | A1 | 2/2010 | Hodoshima et al. |
| 2010/0054781 | A1 | 3/2010 | Noguchi et al. |
| 2010/0239282 | A1 | 9/2010 | Ashikawa et al. |

* cited by examiner

Ds<Dp

Ds=Dp

Ds=2×Dp

Ds>2×Dp

BELT MEANDERING PREVENTING DEVICE AND IMAGE FORMING APPARATUS INCLUDING THE SAME

BACKGROUND OF THE INVENTION

1. Field of the Invention

A certain aspect of the present invention relates to a belt meandering preventing device and an image forming apparatus including the belt meandering preventing device.

2. Description of the Related Art

Certain types of image forming apparatuses, e.g., copiers and printers, use an endless belt such as an intermediate transfer belt, a photosensitive belt, or a paper conveying belt to form an image. Such an endless belt is normally stretched over two or more rollers including a drive roller. While the endless belt is run (driven or rotated), the endless belt is often displaced in a direction (hereafter called a belt width direction) orthogonal to its running direction. This displacement may be hereafter called belt meandering. When an image is formed on the outer surface of the endless belt or on a recording medium placed on the outer surface of the endless belt, the belt meandering causes distortion of the image. Also, when a multi-color image is formed by sequentially forming single-color images on the endless belt such that they overlap each other, the belt meandering causes misalignment of the single-color images in the belt width direction and thereby causes problems such as a color shift and color shading. Since such a color shift and color shading are easily noticed by the user, it is important to properly prevent the belt meandering when forming a color image.

In a known method, the tilt of one or more support rollers (hereafter called steering rollers) for supporting an endless belt is controlled to prevent the meandering of the endless belt (this method is hereafter called a steering method). Compared with a method where a rib or a guide provided at one end in the belt width direction of the inner surface of an endless belt is hooked to an end face of a support roller to prevent the belt meandeting, the steering method makes it possible to reduce the external force applied to the endless belt. Therefore, the steering method improves the running stability and durability of an endless belt and provides higher reliability.

When the steering method is employed, it is necessary to detect the amount of displacement of the endless belt in the belt width direction and thereby to determine the controlled variable (the amount of tilt) of the steering roller. Also, to properly prevent the belt meandering by controlling the steering roller, it is important to detect the amount of displacement (hereafter called the amount of meandering) in the belt width direction at a high resolution. However, for the reasons described below, it is difficult to achieve both a required detection range (a detectable range of the amount of meandering) and a required detection resolution.

Just after an endless belt is installed or replaced by an assembly worker or a service person, there is normally a positional error of ±2-3 mm from the correct position in the belt width direction. When this positional error is taken into account, a detection range of ±2-3 mm is necessary to detect the amount of displacement of the endless belt in the belt width direction. Meanwhile, to keep the amount of meandering of the endless belt within a certain range and thereby to effectively prevent a color shift and color shading in a multi-color image, a. detection resolution of about 0.005 mm is necessary. That is, for a required detection range of ±2-3 mm, a detection resolution of more than 1000× (0.005 mm) is necessary. Needless to say, it is possible to achieve both a wide detection range and a high detection resolution as described above by using very expensive sensors. Practically, however, it is necessary to achieve both a wide detection range and a high detection resolution by using a simple sensor configuration including inexpensive analog-output optical sensors with an output voltage range of 0-5 V. However, to obtain a 1000× resolution for the above detection range using inexpensive analog-output optical sensors with an output voltage range of 0-5 V, it is necessary to detect a voltage (a sensor output) in units of 5 mV. Considering the noise in a device and the capability of an analog-to-digital conversion circuit of a controller, it is difficult to properly and reliably detect a voltage in units of 5 mV.

Japanese Patent Application Publication No. 2008-275800 and Japanese Patent Application Publication No. 2005-338522 propose belt meandering preventing devices in trying to achieve both a wide detection range and a high detection resolution using multiple inexpensive sensors.

The belt meandering preventing device disclosed in JP2008-275800 includes a first detection unit for detecting the amount of displacement of an endless belt in the belt width direction in a range of ±1 mm from a normal position of the endless belt; and a second detection unit for detecting an overrun that is a displacement of the endless belt of more than ±5 mm from the normal position of the endless belt. The belt meandering preventing device corrects the displacement of the endless belt in the belt width direction according to the amount of displacement detected by the first detection unit, or stops the endless belt and reports an error if an overrun is detected by the second detection unit. The first detection unit is a displacement sensor positioned to face a swinging direction of a swing arm that swings about a spindle in accordance with the displacement of the endless belt in the belt width direction. With the belt meandering preventing device of JP2008-275800, the displacement of the endless belt within the detection range (±1 mm from the normal position of the endless belt) of the first detection unit can be corrected, and also damage to the endless belt caused by an overrun can be prevented by detecting the overrun with the second detection unit provided separately from the first detection unit. The belt meandering preventing device disclosed in JP2005-338522 includes a swing arm that swings about a spindle in accordance with the displacement of an endless belt in the belt width direction and first and second displacement sensors facing the swinging direction of the swing arm and placed at different. distances from the spindle. The first displacement sensor closer to the spindle has a wider detection range and a lower resolution; and the second displacement sensor further from the spindle has a narrower detection range and a higher resolution. The belt meandering device of JP2005-338522 corrects the displacement of the endless belt in the belt width direction within the detection range (±1 mm from a normal position of the endless belt) of the second displacement sensor based on a signal from the second displacement sensor with a higher detection resolution, and corrects the displacement of the endless belt in the belt width direction beyond the detection range of the second displacement sensor based on a signal from the first displacement sensor with a lower detection resolution.

Both of the belt meandering preventing devices of JP2008-275800 and JP2005-338522 use two sensors to detect the displacement of the endless belt in the belt width direction. However, with the configurations of JP2008-275800 and JP2005-338522, the width of a high-resolution detection range where the displacement of the endless belt can be detected at a high resolution is substantially the same as the width of a high-resolution detection range that is achievable by one sensor. Thus, with the configurations of JP2008-

275800 and JP2005-338522, it is difficult to detect the displacement of an endless belt in the belt width direction at a high detection resolution in a wide detection range.

SUMMARY OF THE INVENTION

According to an aspect of the present invention, a belt meandering preventing device includes a belt displacement detection unit detecting the amount of displacement in a belt width direction of an endless belt rotatably stretched over support parts; and a belt meandering correction unit correcting the displacement in the belt width direction of the endless belt based on the amount of displacement detected by the belt displacement detection unit. The belt displacement detection unit includes a moving part moving in association with the displacement of the endless belt or an edge of the endless belt in the belt width direction and optical sensors outputting signals with output levels corresponding to the proportions of the moving part in optical paths of the optical sensors. The optical sensors are arranged such that the output levels of the optical sensors change as the endless belt is displaced in the belt width direction in a predetermined high-resolution detection range. The belt displacement detection unit is configured to combine the output signals of the optical sensors such that the rate of change of an output level of the combined signal with respect to the amount of displacement in the belt width direction of the endless belt within the high-resolution detection range becomes greater than the rates of change of the output levels of the respective optical sensors and to detect the amount of displacement based on the combined signal.

BRIEF DESCRIPTION OF THE DRAWINGS

FIG. 12 B is a graph showing a relationship between a difference (Va−Vb) of the sensor outputs Va and Vb of the two optical sensors and the amount of belt displacement;

DESCRIPTION OF THE PREFERRED EMBODIMENTS

Preferred embodiments of the present invention are described below with reference to the accompanying drawings.

A configuration of a printer as an example of an electrophotographic image forming apparatus according to an embodiment of the present invention is described below.

Figure 1:
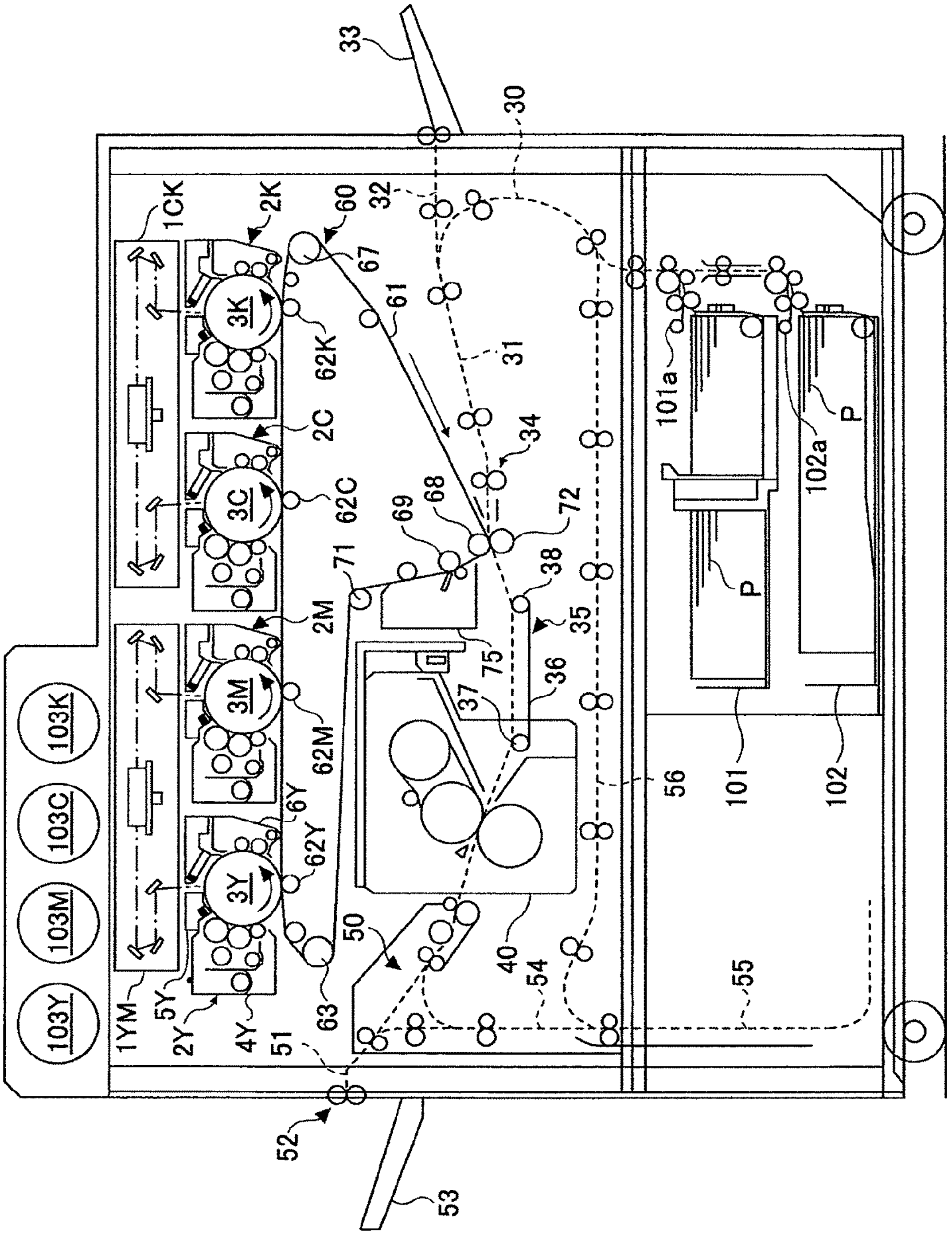
FIG. 1 is schematic diagram of an exemplary printer according to an embodiment of the present invention.

FIG. 1 is schematic diagram of a printer of this embodiment.

The printer includes two optical scanning units 1YM and 1CK and four process units 2Y, 2M, 2C, and 2K that, respectively, form yellow (Y), magenta (M), cyan (C), and black (K) toner images. The printer also includes a paper-feed path 30, a before-transfer conveyance path 31, a manual-paper-feed path 32, a manual-feed tray 33, a resist roller pair 34, a conveyor belt unit 35, a fusing unit 40, a conveyance path switching unit 50, a paper-ejection path 51, a paper-ejection roller pair 52, a paper-catch tray 53, a first paper-feed cassette 101, a second paper-feed cassette 102, and a re-feeding unit.

Each of the first paper-feed cassette 101 and the second paper-feed cassette 102 contains sheets of recording paper P as recording media. With the rotation of a paper-feed roller 101*a* or 102*a*, the uppermost sheet of the recording paper P is fed from the paper-feed cassette 101 or 102 to the paper-feed path 30. The paper-feed path 30 is followed by the before-transfer conveyance path 31 for conveying the recording paper P in a section leading to a secondary transfer nip described later. The recording paper P fed from the paper-feed cassette 101 or 102 goes through the paper-feed path 30 and enters the before-transfer conveyance path 31.

The manual-feed tray 33 is attached to a side of the case of the printer such that it can be opened and closed with respect to the case. With the manual-feed tray 33 opened, sheets of recording paper P can be manually placed on the upper surface of the manual-feed tray 33. The uppermost sheet of the recording paper P on the manual-feed tray 33 is fed by a feeding roller of the manual feed tray 33 toward the before-transfer conveyance path 31.

Each of the optical scanning units 1YM and 1CK includes laser diodes, a polygon mirror, and lenses (not shown) and drives the laser diodes according to image information obtained by a separate scanner or sent from a personal computer to optically scan photoconductors 3Y, 3M, 3C, and 3K of the process units 2Y, 2M, 2C, and 2K. The photoconductors 3Y, 3M, 3C, and 3K of the process units 2Y, 2M, 2C, and 2K are rotated counterclockwise in FIG. 1 by a driving unit (not shown). The optical scanning unit 1YM deflects laser beams in the rotational axis directions of the photoconductors 3Y and 3M and thereby optically scans the photoconductors 3Y and 3M. As a result, electrostatic latent images corresponding to Y image information and M image information are formed on the corresponding photoconductors 3Y and 3M. Similarly, the optical scanning unit 1CK deflects laser beams in the rotational axis directions of the photoconductors 3C and 3K and thereby optically scans the photoconductors 3C and 3K. As a result, electrostatic latent images corresponding to C image information and K image information are formed on the corresponding photoconductors 3C and 3K.

The process units 2Y, 2M, 2C, and 2K, respectively, include drum-shaped photoconductors 3Y, 3M, 3C, and 3K used as latent image carriers. In addition, each of the process units 2Y, 2M, 2C, and 2K includes various components that are disposed around the photoconductor 3Y/3M/3C/3K and supported on the same support. The process units 2Y, 2M, 2C, and 2K are removably attached to the printer body. The process units 2Y, 2M, 2C, and 2K have substantially the same configuration except that they use toners of different colors. Take, for example, the process unit 2Y. The process unit 2Y includes the photoconductor 3Y and a developing unit 4Y that develops an electrostatic latent image formed on the surface of the photoconductor 3Y to form a Y-toner image. The process unit 2Y also includes a charging unit 5Y for uniformly charging the surface of the photoconductor 3Y being rotated, and a drum cleaning unit 6Y for removing post-transfer residual toner adhering to the surface of the photoconductor 3Y after it passes through a primary transfer nip for the Y component described later.

The printer shown by FIG. 1 is configured as a tandem image forming apparatus where four process units 2Y, 2M, 2C, and 2K are arranged along the rotational direction of an intermediate transfer belt 61 described later.

In this embodiment, the photoconductor 3Y is shaped like a drum and is made by forming a photosensitive layer on a base tube made of, for example, aluminum by applying an organic photosensitive material. Alternatively, a photoconductor shaped like an endless belt may be used as the photoconductor 3Y.

The developing unit 4Y uses a two-component developer (hereafter, simply called a developer) including magnetic carriers and nonmagnetic yellow toner to develop a latent image. Alternatively, the developing unit 4Y may be configured to use a one-component developer including no magnetic carrier instead of a two-component developer. A Y-toner supplying unit (not shown) supplies Y toner from a Y-toner bottle 103Y to the developing unit 4Y.

The drum cleaning unit 6Y includes a cleaning blade made of polyurethane rubber that is brought into contact with the photoconductor 3Y. A drum cleaning unit with a different configuration may also be used. In this embodiment, a rotatable fur brush that is brought into contact with the photoconductor 3Y is also provided to improve the cleaning performance. The fur brush also scrapes lubricant from a solid lubricant (not shown), reduces the scraped lubricant to a fine powder, and applies the fine powder to the surface of the photoconductor 3Y.

A discharge lamp (not shown) is also provided above the photoconductor 3Y as a component of the process unit 2Y. The discharge lamp illuminates and thereby discharges the surface of the photoconductor 3Y after it passes through the drum cleaning unit 6Y. The discharged surface of the photoconductor 3Y is uniformly charged by the charging unit 5Y and is then optically scanned by the optical scanning unit 1YM. The charging unit 5Y is rotated while being supplied with a charging bias from a power supply (not shown). Instead of the charging unit 5Y, a scorotron charger may be used. A scorotron charger charges a photoconductor without contact.

The process units 2M, 2C, and 2K have configurations similar to the configuration of the process unit 2Y described above.

A transfer unit 60 is disposed below the process units 2Y, 2M, 2C, and 2K. The transfer unit 60 includes an endless intermediate transfer belt 61 stretched over multiple support rollers. The intermediate transfer belt 61 is in contact with the photoconductors 3Y, 3M, 3C, and 3K and is rotated (or run)

clockwise in FIG. 1 by the rotation of one of the support rollers. With this configuration, primary transfer nips for the C, M, Y, K components are formed between the photoconductors 3C, 3M, 3Y, and 3K and the intermediate transfer belt 61.

Near the primary transfer nips for the Y, M, C, K components, the intermediate transfer belt 61 is pressed against the photoconductors 3Y, 3M, 3C, and 3K by primary transfer rollers 62Y, 62M, 62C, and 62K disposed inside of the belt loop, i.e., inside of a space surrounded by the inner surface of the intermediate transfer belt 61. A primary transfer bias is applied to the primary transfer rollers 62Y, 62M, 62C, and 62K from a power supply (not shown). As a result, primary transfer electric fields are formed at the primary transfer nips for the Y, M, C, K components, and the primary transfer electric fields cause toner images on the photoconductors 3Y, 3M, 3C, and 3K to be electrostatically transferred onto the intermediate transfer belt 61.

When the intermediate transfer belt 61 is rotated clockwise, the outer surface of the intermediate transfer belt 61 passes through the primary transfer nips for the Y, M, C, K components in sequence. As a result, the toner images are sequentially transferred to the outer surface of the intermediate transfer belt 61 and are superposed on the outer surface (primary transfer process). As a result of the primary transfer process, a superposed toner image with four colors (hereafter called a four-color toner image) is formed on the outer surface of the intermediate transfer belt 61.

A secondary transfer roller 72 used as a secondary transfer part is provided below the intermediate transfer belt 61. Also, a secondary transfer backup roller 68 is disposed inside of the loop of the intermediate transfer belt 61 so as to contact the inner surface of the intermediate transfer belt 61. The secondary transfer roller 72 is in contact with the outer surface of the intermediate transfer belt 61 at a position corresponding to the secondary transfer backup roller 68. With this configuration, a secondary transfer nip is formed between the outer surface of the intermediate transfer belt 61 and the secondary transfer roller 72.

A secondary transfer bias is applied to the secondary transfer roller 72 by a power supply (not shown). Meanwhile, the secondary transfer backup roller 68 in the belt loop is grounded. With this configuration, a secondary transfer electric field is formed in the secondary transfer nip.

The resist roller pair 34 is disposed to the right of the secondary transfer nip. Two rollers of the resist roller pair 34 feed the recording paper P to the secondary transfer nip in synchronization with the movement of the four-color toner image on the intermediate transfer belt 61. At the secondary transfer nip, the four-color toner image on the intermediate transfer belt 61 is caused to be transferred onto the recording paper P by the secondary transfer electric field and the nip pressure, and forms a full color image in combination with the white color of the recording paper P.

After the intermediate transfer belt 61 passes through the secondary transfer nip, toner (post-transfer residual toner) that has not been transferred onto the recording paper P remains on the outer surface of the intermediate transfer belt 61. The post-transfer residual toner is removed by a belt cleaning unit 75 that is in contact with the intermediate transfer belt 61.

Meanwhile, the recording paper P that has passed through the secondary transfer nip is separated from the intermediate transfer belt 61 and is passed to the conveyor belt unit 35. The conveyor belt unit 35 includes a drive roller 37, a driven roller 38, and an endless conveyor belt 36 stretched over the drive roller 37 and the driven roller 38. The conveyor belt 36 is rotated counterclockwise in FIG. 1 by the rotation of the drive roller 37. The recording paper P passed from the intermediate transfer belt 61 is held on the outer surface of the conveyor belt 36 and is conveyed to the fusing unit 40 by the rotation of the conveyor belt 36.

A re-feeding unit is formed by the conveyance path switching unit 50, a re-feeding path 54, a switchback path 55, and an after-switchback conveyance path 56. The conveyance path switching unit 50 switches destinations of the recording paper P received from the fusing unit 40 between the paper-ejection path 51 and the re-feeding path 54. When simplex printing where an image is formed only on one side of the recording paper P is performed, the conveyance path switching unit 50 selects the paper-ejection path 51 as the destination of the recording paper P. As a result, the recording paper P only on one side of which an image has been formed is conveyed via the paper-ejection path 51 to the paper ejection-roller pair 52 and ejected onto the paper-catch tray 53. Also, when the recording paper P on both sides of which images have been formed is received from the fusing unit 40 in a duplex printing mode, the conveyance path switching unit 50 selects the paper-ejection path 51 as the destination of the recording paper P. As a result, the recording paper P on both sides of which images have been formed is ejected onto the paper-catch tray 53. Meanwhile, when the recording paper P only on a first side of which an image has been formed is received from the fusing unit 40 in a duplex printing mode, the conveyance path switching unit 50 selects the re-feeding path 54 as the destination of the recording paper P.

The recording paper P conveyed into the re-feeding path 54 enters the switchback path 55 connected to the re-feeding path 54. When the entire recording paper P enters the switchback path 55, the conveying direction of the recording paper P is reversed. The switchback path 55 is also connected to the after-switchback conveyance path 56. The recording paper P being conveyed in the reverse direction enters the after-switchback conveyance path 56 and as a result, the recording paper P is turned over. The turned-over recording paper P is conveyed via the after-switchback conveyance path 56 and the paper-feed path 30 to the second transfer nip again. After a toner image is transferred onto a second side of the recording paper P at the secondary transfer nip and the toner image is fused onto the second side by the fusing unit 40, the recording paper P is ejected via the conveyance path switching unit 50, the paper-ejection path 51, and the paper ejection-roller pair 52 onto the paper-catch tray 53.

Next, a belt drive unit for driving the intermediate transfer belt 61 is described.

Figure 2:
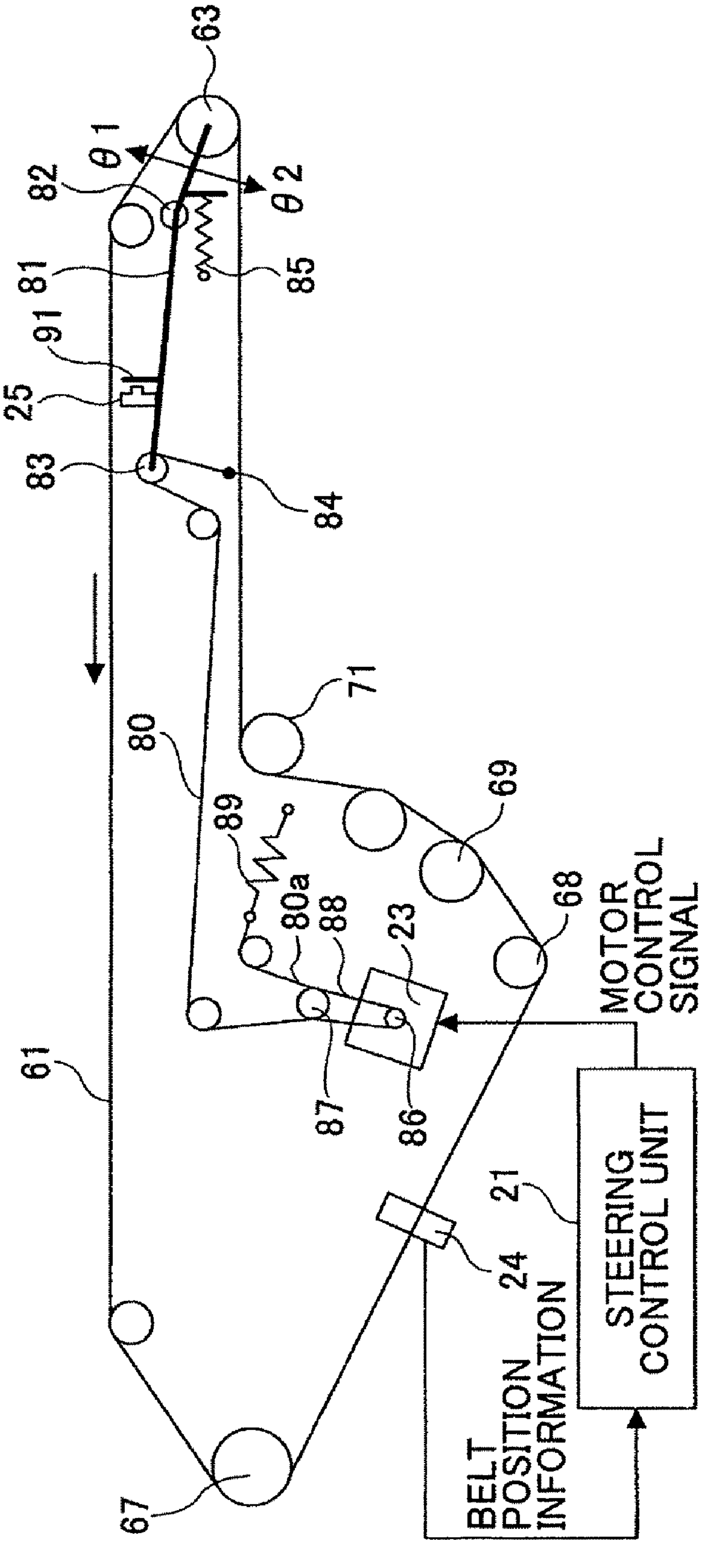
FIG. 2 is a schematic diagram of a belt drive unit for driving an intermediate transfer belt of the printer of FIG. 1.

FIG. 2 is a schematic diagram of a belt drive unit according to an embodiment of the present invention.

The belt drive unit of this embodiment includes support rollers 63, 67, 68, 69, and 71; the intermediate transfer belt 61 that is an endless belt stretched over the support rollers 63, 67, 68, 69, and 71; a tilting mechanism that is driven by a steering motor 23 used as a driving source and tilts the support roller (steering roller) 63; an edge sensor 24 used as a belt displacement detection unit for detecting the amount of displacement (amount of meandering) of the intermediate transfer belt 61 in the belt width direction (hereafter may be called the amount of belt displacement); and a steering control unit 21 that determines the amount of tilt of the steering roller 63 based on the amount of belt displacement detected by the edge sensor 24, and controls the steering motor 23 to control the tilting mechanism such that the amount of tilt of the steering roller 63 matches the determined amount of tilt. Thus, the belt drive unit is configured to prevent the meandering of the intermediate transfer belt 61 by changing the amount of tilt of the steering roller 63. In this embodiment, the tilting mechanism and the steering control unit 21 constitute a belt meandering correction unit. Although the support roller 67 is used as the drive roller in this embodiment, a different one of the support rollers may be used as the drive roller.

The steering control unit 21 may be implemented by a separate microcomputer or may be implemented by a controller provided in the printer of this embodiment. The steering control unit 21 adjusts the amount of tilt of the steering roller 63 based on the amount of belt displacement detected by the edge sensor 24 and thereby performs a feedback control to keep the intermediate transfer belt 61 in a normal (target) position in the belt width direction. As long as these functions are achieved, the steering control unit 21 may have any configuration or may be implemented by any device.

Figure 3:
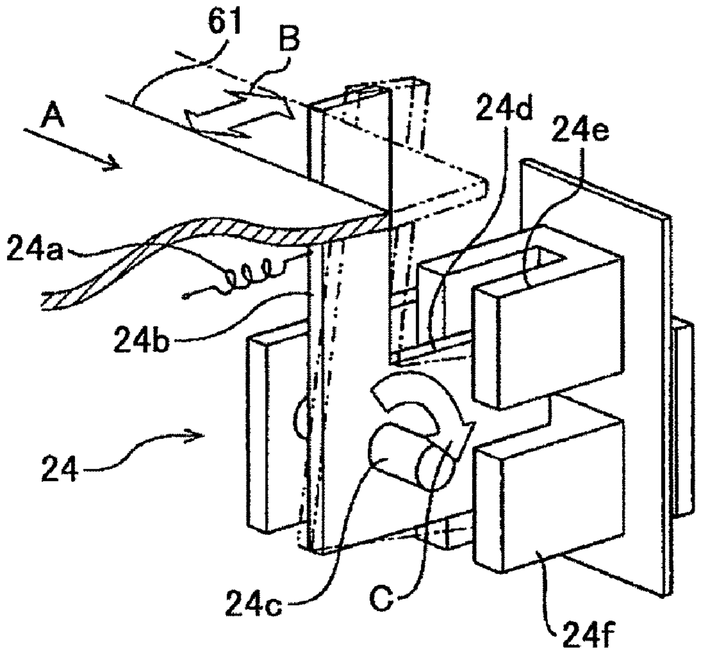
FIG. 3 is a drawing illustrating an exemplary configuration of an edge sensor of the belt drive unit of FIG. 2.

FIG. 3 is a drawing illustrating an exemplary configuration of the edge sensor 24.

Figure 4:
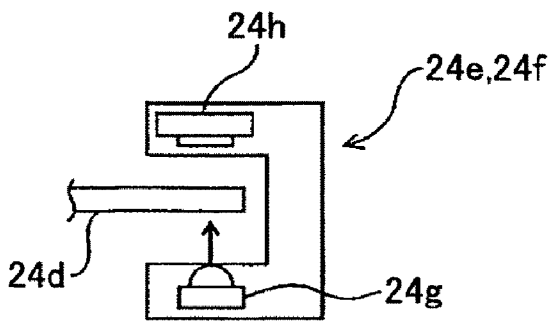
FIG. 4 is a drawing illustrating an exemplary configuration of transmissive optical sensors of the edge sensor of FIG. 3.

FIG. 4 is a drawing illustrating an exemplary configuration of transmissive optical sensors 24*e* and 24*f* of the edge sensor 24.

As shown in FIG. 3, an L-shaped arm part used as a moving part and rotatably supported on a spindle 24*c* is disposed at one side (edge) of the intermediate transfer belt 61. The arm part is biased (or pulled) by a spring 24*a* so that a contact part 24*b* of the arm part is always in contact with the side of the intermediate transfer belt 61. The contacting pressure of the contact part 24*b* caused by the spring 24*a* is set at an appropriate level such that the side of the intermediate transfer belt 61 is not deformed. The arm part also includes a light-shielding part 24*d*. As shown in FIG. 4, each of the transmissive optical sensors 24*e* and 24*f* includes a light-emitting part 24*g* and a light-receiving part 24*h* that face each other with the light-shielding part 24*d* positioned between them. As shown in FIG. 3, the optical sensors 24*e* and 24*f* are arranged along the direction in which the light-shielding part 24*d* moves when the arm part rotates about the spindle 24*c*.

With the edge sensor 24 configured as described above, the movement (meandering) of the intermediate transfer belt 61 in the belt width direction (indicated by arrow B in FIG. 3) is converted via the contact part 24*b* contacting the side of the intermediate transfer belt 61 into the rotational movement of the arm part about the spindle 24*c*. While the leading edge or the rear edge of the light-shielding part 24*d* in the rotational direction of the arm part is in the sensor ranges of the optical sensors 24*e* and 24*f*, the output levels of the optical sensors 24*e* and 24*f* change according to the rotational movement of the arm part. Accordingly, the sensor outputs of the optical sensors 24*e* and 24*f* indicate the amount of belt displacement (meandering) of the intermediate transfer belt 61. In this embodiment, as shown in FIG. 2, the edge sensor 24 is disposed between the drive roller 67 and the secondary transfer backup roller 68 in the belt movement direction (rotational direction).

Each of the optical sensors 24*e* and 24*f* outputs an analog voltage corresponding to the intensity of light received by the light-receiving part 24*h* and may be implemented by an inexpensive optical sensor such as an analog-output transmissive photointerrupter.

The configuration of the edge sensor 24 is not limited to that described above as long as the edge sensor 24 includes multiple optical sensors each of which outputs a signal with an output level corresponding to the proportion of a moving part, which moves in association with the displacement in the belt width direction of the intermediate transfer belt 61, in the optical path, and the optical sensors are disposed such that output levels of all the optical sensors change when the intermediate transfer belt 61 is displaced in the belt width direction in a predetermined range. For example, although the movement of the intermediate transfer belt 61 in the belt width direction is converted into the rotational movement of the moving part (arm part), the edge sensor 24 may be configured such that the movement of the intermediate transfer belt 61 in the belt width direction is converted into the linear movement of the moving part. Also, the edge sensor 24 may be configured to directly detect an edge of the intermediate transfer belt 61 in the belt width direction without using the moving part and thereby to detect the amount of displacement of the intermediate transfer belt 61 in the belt width direction.

Figure 5:
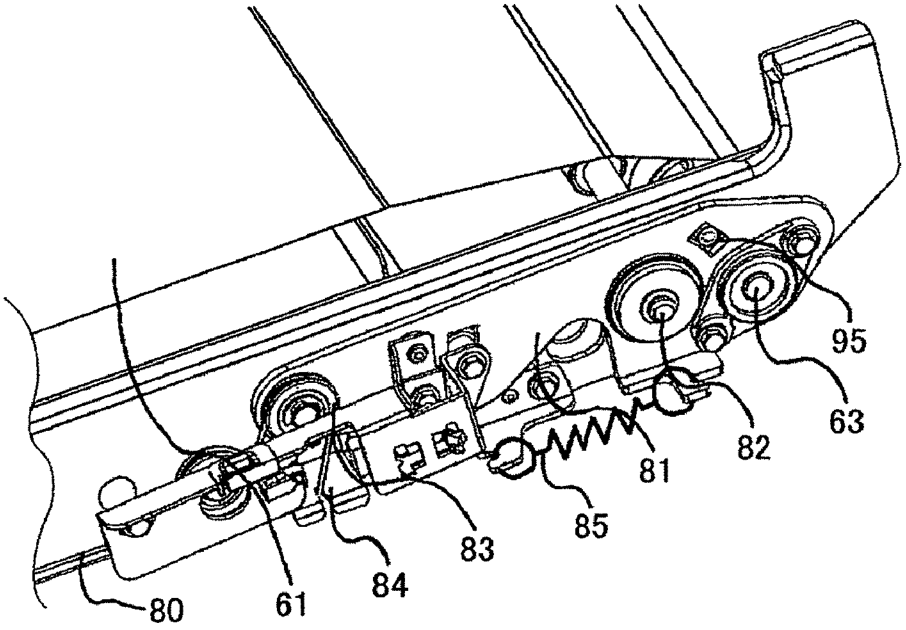
FIG. 5 is a perspective view, seen from above at an oblique angle, of a tilting mechanism provided at one end (drive end) of a steering roller of the belt drive unit of FIG. 2.

FIG. 5 is a perspective view, seen from above at an oblique angle, of the tilting mechanism provided at one end (drive end) of the steering roller 63.

Figure 6:
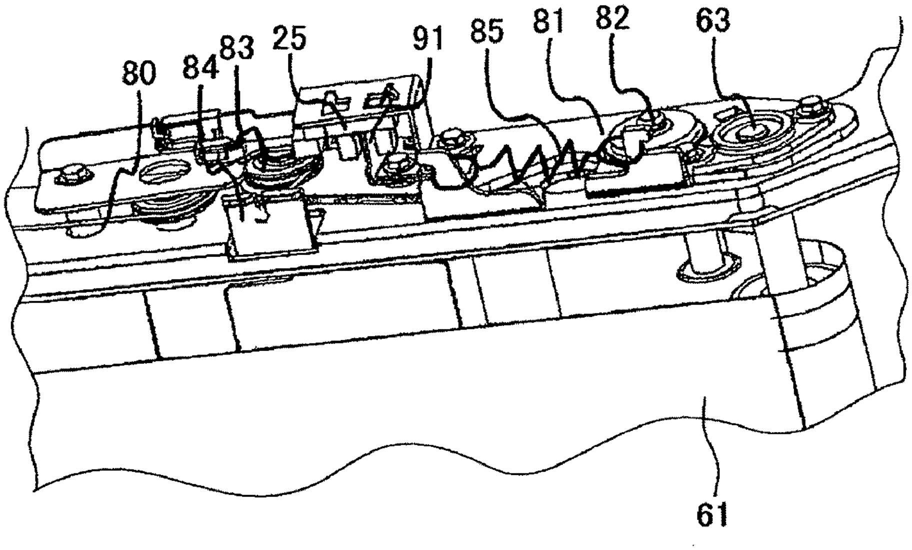
FIG. 6 is a perspective view, seen from below at an oblique angle, of the tilting mechanism of FIG. 5.

FIG. 6 is a perspective view, seen from below at an oblique angle, of the tilting mechanism.

In this embodiment, as shown in FIG. 2, the tilting mechanism for tilting the steering roller 63 employs a cantilevered wire method. The tilting mechanism is described below in more detail.

A drive pulley 86 is provided on the output shaft of the steering motor 23. A timing belt 88 is stretched over the drive pulley 86 and a wind-up pulley 87. The wind-up pulley 87 includes a belt pulley part around which the timing belt 88 is wound and a wire pulley part to which one end (hereafter called a drive end) of a wire 80 is fixed. The belt pulley part and the wire pulley part are coaxial and are formed as a monolithic structure. When the steering motor 23 is driven and the drive pulley 86 is rotated, the wind-up pulley 87 is rotated via the timing belt 88 and the drive end portion of the wire 80 is wound around the wire pulley part. In this embodiment, the diameter of the wire pulley part is smaller than the diameter of the belt pulley part. Accordingly, the wind-up pulley 87 is configured as a deceleration unit.

Also in this embodiment, the drive end of the wire 80 is fixed to the wind-up pulley 87. Meanwhile, the other end of the wire 80 is wound around a moving pulley 83 and fixed to a wire holding part 84. The moving pulley 83 is rotatably supported by one end of a long roller holder 81. The drive end of the steering roller 63 is rotatably supported by the other end of the roller holder 81. The roller holder 81 is rotatably supported by a spindle 82 at a point in its length direction. Also, the roller holder 81 is biased by a tension spring 85 in the clockwise direction around the spindle 82 in FIG. 2. In other words, the tension spring 85 biases the moving pulley 83 upward and thereby applies tension to the wire 80 wound around the moving pulley 83. Thus, the tension spring 85 functions as a tension applying unit that constantly applies an appropriate amount of tension to the wire 80.

A wire part 80*a* is being pulled by a tension spring 89 and as a result, a bias causing counterclockwise rotation in FIG. 2 is applied to the wind-up pulley 87. The wire part 80*a* and the tension spring 89 are provided to reduce the drive torque of the steering motor 23. When the steering motor 23 is driven (rotated) in a direction against the bias provided by the tension spring 85, the load of the steering motor 23 is increased by the bias applied by the tension spring 85. However, the bias applied by the tension spring 89 in the rotational direction reduces the load of the steering motor 23.

In the tilting mechanism configured as described above, when the steering motor 23 is driven, the wire 80 is wound around or unwound from the wind-up pulley 87. As a result, the moving pulley 83 moves and causes the roller holder 81 to rotate about the spindle 82. The rotation of the roller holder 81 in turn causes the drive end of the steering roller 63 to move with respect to the other end and the steering roller 63 is tilted. With the tilting mechanism of this embodiment where the wire 80 is wound around the wind-up pulley 87, the maximum amount of movement of the wire 80 is large. This in turn makes it possible to increase the tilting range within which the steering roller 63 can be tilted. On the other hand, if the tilting range of the steering roller 63 is too wide and the roller holder 81 is likely to interfere with surrounding parts, a limiting part for limiting the rotation range of the roller holder 81 may be provided. In this embodiment, a stopper 95 is provided as the limiting part as shown in FIG. 5.

Also, since the maximum amount of movement of the wire 80 is large, it is possible to achieve a sufficient tilting range of the steering roller 63 even when a deceleration unit is employed. This in turn makes it possible to accurately control the amount of tilt of the steering roller 63 by using the deceleration unit. In this embodiment, the rotational motion of the steering motor 23 is decelerated by the ratio between the diameters of the belt pulley part and the wire pulley part of the wind-up pulley 87, the moving pulley 83, and the ratio between the distances from the spindle 82 to the respective ends of the roller holder 81; and the reduced rotational motion is transmitted to the roller holder 81. This configuration makes it possible to increase the resolution of the amount of tilt of the steering roller 63 and thereby makes it possible to accurately control the amount of tilt of the steering roller 63.

Unlike a cam method where a cam is used instead of a wire, the wire method employed in this embodiment makes it possible to place the steering motor 23 in a position distant from the steering roller 63. This in turn makes it possible to more flexibly lay out the components around the steering roller 63. Also, compared with a method where a loop of wire is used as disclosed in JP2008-275800, the cantilevered wire method employed in this embodiment makes it possible to reduce the space necessary for the wire and makes it easier to handle the wire.

Figure 7:
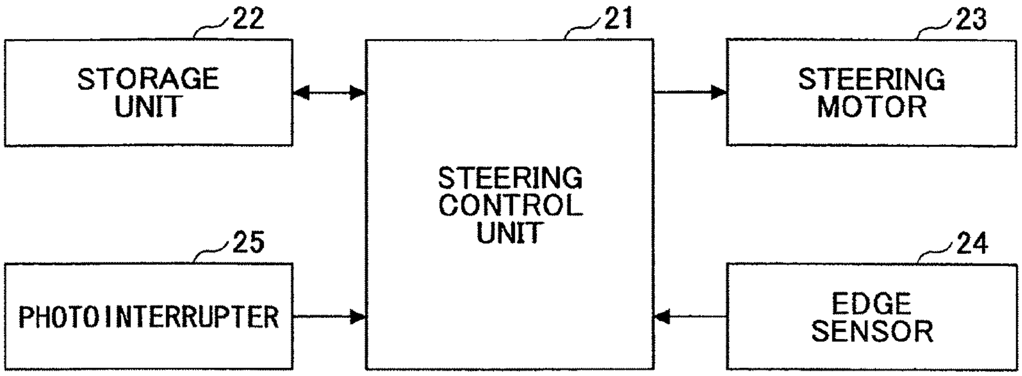
FIG. 7 is a block diagram illustrating a control mechanism of a belt meandering preventing device of the belt drive unit of FIG. 2.

FIG. 7 is a block diagram illustrating a control mechanism of a belt meandering preventing device of the belt drive unit.

The steering control unit 21 outputs a motor control signal (motor drive signal) for controlling the steering motor 23. The steering motor 23 is implemented, for example, by a stepping motor or a linear motor, the rotational angle and the rotational speed of which can be accurately controlled. In this embodiment, a stepping motor is used as the steering motor 23. The steering control unit 21 is connected to the edge sensor 24 and receives belt position information from the edge sensor 24. The steering control unit 21 is also connected to a photointerrupter 25 described later and receives reference tilted position information from the photointerrupter 25. The steering control unit 21 is further connected to a storage unit 22. The storage unit 22 stores the amount of movement (rotational angle) of the steering motor 23 as a reference rotational angle (movement reference value) when the reference tilted position information is input from the photointerrupter 25.

Whether the tilted position of the steering roller 63 matches the reference tilted position is determined by detecting the position of a position-shifting part that moves together with the steering roller 63 according to the amount of tilt of the steering roller 63. In this embodiment, a filler 91 fixed to the roller holder 81, which rotates along with the tilting of the steering roller 63, is used as the position-shifting part. A light-emitting part and a light-receiving part of the photointerrupter 25 are disposed on the corresponding sides of the moving path of the filler 91. The photointerrupter 25 is placed in a position that corresponds to a position where the filler 91 is present when the steering roller 63 is in the reference tilted position. When the steering roller 63 is in the reference tilted position, the filler 91 interrupts the optical path of the photointerrupter 25 and the output level of the light-receiving part becomes less than or equal to a predetermined value. When the output level of the photointerrupter becomes less than or equal to the predetermined value, the reference tilted position information is input to the steering control unit 21. The steering control unit 21 determines that the steering roller 63 is in the reference tilted position if the reference tilted position information is received.

The steering control unit 21 stores, in the storage unit 22, the amount of movement (rotational angle) of the steering motor 23 that is detected when the reference tilted position information is input from the photointerrupter 25 as a reference rotational angle (movement reference value). The reference rotational angle stored in the storage unit 22 is updated at every predetermined adjustment timing. In this embodiment, the adjustment timing is defined as the timing when the printer is powered on. Therefore, the reference rotational angle is updated each time when the printer is turned on. With this configuration, even if the wire 80, which is a component of the tilting mechanism, is stretched due to some reason, a control error caused by the stretched wire 80 is corrected each time the printer is powered on.

Figure 8:
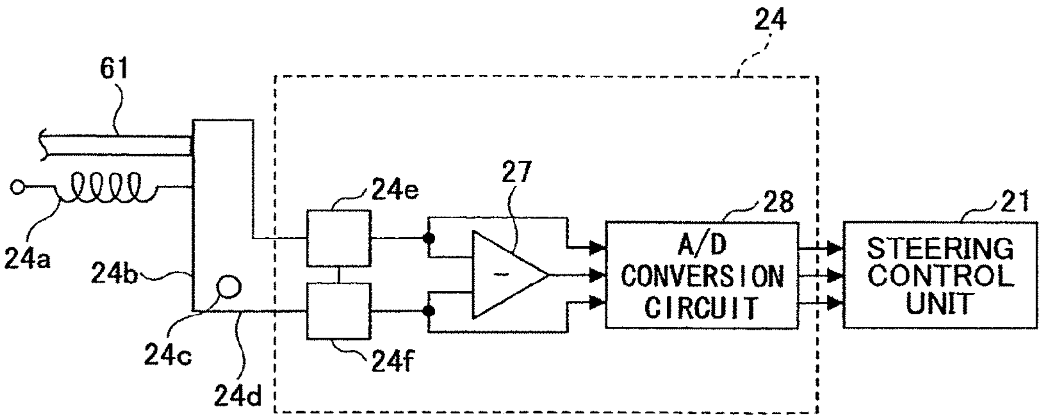
FIG. 8 is a drawing illustrating a control mechanism of the edge sensor of FIG. 3.

FIG. 8 is a drawing illustrating a control mechanism of the edge sensor 24.

In this embodiment, the edge sensor 24 is configured such that when the arm part rotates clockwise in FIG. 8, the rear edge of the light-shielding part **24*d* enters the sensor range of the first optical sensor 24*e* and the leading edge of the light-shielding part 24*d* enters the sensor range of the second optical sensor 24*f* substantially at the same timing; and also the rear edge of the light-shielding part 24*d* exits from the sensor range of the first optical sensor 24*e* and the leading edge of the light-shielding part 24*d* exits from the sensor range of the second optical sensor 24*f* substantially at the same timing. With this configuration, the sensor outputs Va and Vb of the optical sensors 24*e* and 24*f* show waveforms as shown in FIG. 9A where the horizontal axis indicates the amount of belt displacement (displacement in the clockwise direction in FIG. 8 is represented by a change in the plus direction and displacement in the counterclockwise direction in FIG. 8** is represented by a change in the minus direction).

In this embodiment, the detection ranges (the ranges within which the output levels vary according to the displacement of the intermediate transfer belt 61 in the belt width direction) of the optical sensors **24*e* and 24*f* overlap each other. The overlapping detection range of the optical sensors 24*e* and 24*f* where the amount of belt displacement can be detected at a high detection resolution may be used as a detection range (high-resolution detection range) C of the edge sensor 24. More particularly, in this embodiment, output levels exceeding a threshold Vth are used for detection to remove noise and the detection range (high-resolution detection range) C of the edge sensor 24 is defined as shown in FIG. 9**A.

Figure 9A:
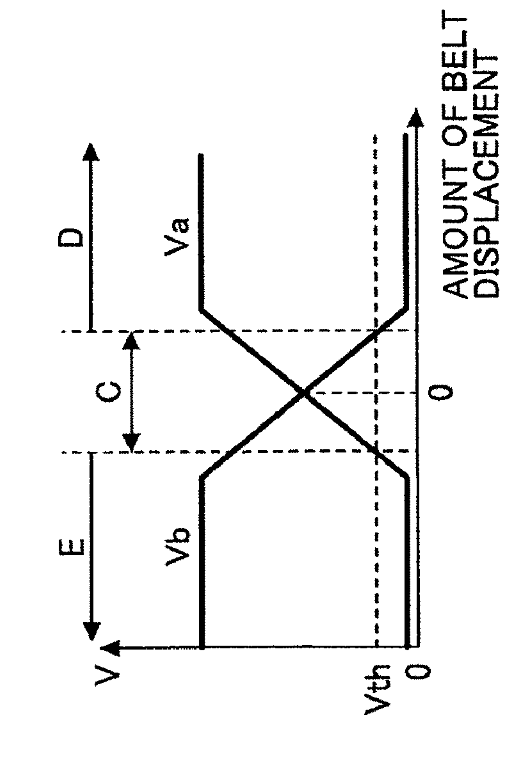
FIG. 9A is a graph showing a relationship between sensor outputs Va and Vb of two optical sensors of the edge sensor and the amount of belt displacement.

Although the detection ranges of the optical sensors **24*e* and 24*f* are substantially the same in the example shown in FIG. 9A, the edge sensor 24 may be configured such that the detection ranges of the optical sensors 24*e* and 24*f*** partly overlap each other as long as the overlapping detection range has a width that is sufficient as the high-resolution detection range C.

Also in this embodiment, the arm part is adjusted such that, in terms of the clockwise rotational direction of the arm part, the rear edge of the light-shielding part **24*d* is substantially at the center of the sensor range of the first optical sensor 24*e* and the leading edge of the light-shielding part 24*d* is substantially at the center of the sensor range of the second optical sensor 24*f* when the intermediate transfer belt 61 is in the normal position (where the amount of belt displacement=0) in the belt width direction. Therefore, in the graph of FIG. 9A, the intermediate transfer belt 61 is in the normal position (the amount of belt displacement=0) in the belt width direction when the sensor output Va of the first optical sensor 24***e* equals the sensor output Vb of the second optical sensor 24*f* (Vb−Va=0).

Figure 9B:
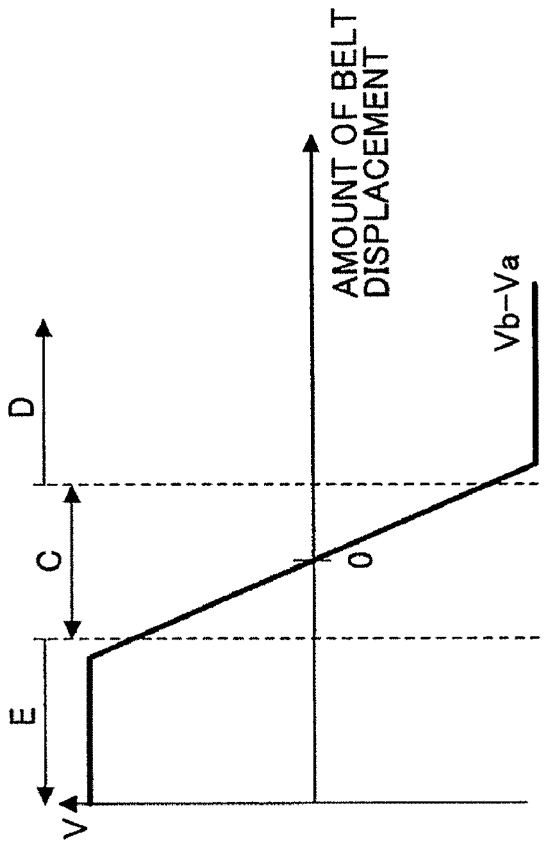
FIG. 9B is a graph showing a relationship between a difference (Vb−Va) of the sensor outputs Va and Vb of the two optical sensors and the amount of belt displacement.

As shown in FIG. 8, in the edge sensor 24 of this embodiment, a differential signal (Vb−Va) between the sensor outputs Va and Vb of the optical sensors 24*e* and 24*f* is obtained by an analog circuit 27, the differential signal (combined signal) is converted by an A/D conversion circuit 28 into a digital signal, and the digital signal is output as the belt position information to the steering control unit 21. Alternatively, the differential signal (Vb−Va) between the sensor outputs of the optical sensors 24*e* and 24*f* may be obtained by software processing using a microcomputer. FIG. 9B shows the differential signal (Vb−Va) between the sensor outputs of the optical sensors 24*e* and 24*f*. As shown in FIG. 9B, the gradient of the differential signal (Vb−Va) in the high-resolution detection range C is greater than the gradient of the respective sensor outputs Va and Vb of the optical sensors 24*e* and 24*f*. The gradient indicates the detection resolution in the high-resolution detection range C. Thus, the detection resolution in the high-resolution detection range C of the edge sensor 24 of this embodiment is greater than the detection resolutions of the respective optical sensors 24*e* and 24*f*.

Figure 10:
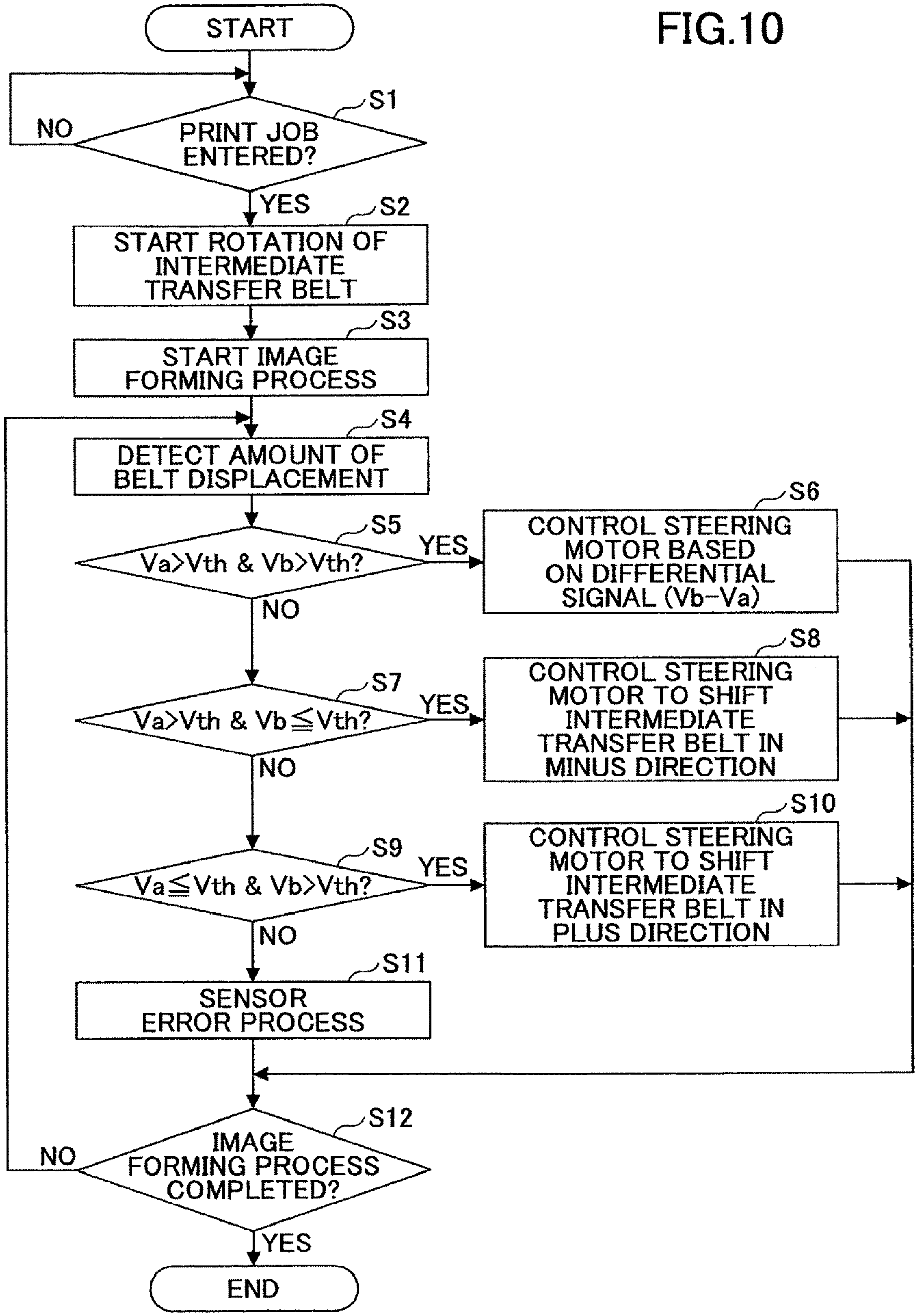
FIG. 10 is a flowchart showing a control process for preventing the meandering of an intermediate transfer belt.

FIG. 10 is a flowchart showing a control process for preventing the belt meandering.

When a print job is entered (S1), rotation of the intermediate transfer belt 61 is started (S2), and an image forming process is performed according to the print job (S3). During the image forming process, the edge sensor 24 detects the displacement (meandering) of the intermediate transfer belt 61 in the belt width direction (S4); and the steering control unit 21 calculates a controlled variable (a target rotational angle) of the steering motor 23 based on the detected amount of displacement and controls the rotational angle of the steering motor 23 to Match the calculated target rotational angle (this process is hereafter called a belt meandering preventing process).

In a belt meandering preventing method of this embodiment, a threshold Vth is used to appropriately switch steering control steps (or modes). As shown in FIG. 9A, the threshold Vth is set at a value that is lower than the voltage at a point where lines indicating the sensor outputs Va and Vb of the optical sensors 24*e* and 24*f* intersect with each other. The steering control unit 21 obtains the sensor outputs Va and Vb of the optical sensors 24*e* and 24*f* and switches steering control steps (modes) as described below by comparing the sensor outputs Va and Vb with the threshold Vth.

When both of the sensor outputs Va and Vb of the optical sensors 24*e* and 24*f* are greater than the threshold Vth (YES in S5), the steering control unit 21 controls the steering motor 23 such that a differential signal (Vb−Va) becomes zero (i.e., so that the amount of belt displacement becomes zero) (S6) and thereby corrects the meandering of the intermediate transfer belt 61. More specifically, when the output shaft of the steering motor 23 is rotated counterclockwise in FIG. 2 while the steering roller 63 is in a horizontal position, the wire 80 is wound around the wind-up pulley 87 and the roller holder 81 is rotated in the θ1 direction in FIG. 2. As a result, the drive end of the steering roller 63 is lifted by the roller holder 81 and is tilted according to the amount of lift. The tilt in turn causes the intermediate transfer belt 61 wound around the steering roller 63 to shift away from the drive end of the steering roller 63 in the belt width direction. Meanwhile, when the output shaft of the steering motor 23 is rotated clockwise in FIG. 2 while the steering roller 63 is in a horizontal position, the wire 80 is unwound from the wind-up pulley 87 and the roller holder 81 is rotated in the θ2 direction in FIG. 2. As a result, the drive end of the steering roller 63 is pressed down by the roller holder 81 and is tilted according to the amount of pressing down. The tilt in turn causes the intermediate transfer belt 61 wound around the steering roller 63 to shift toward the drive end of the steering roller 63 in the belt width direction. Thus, in this embodiment, the displacement (positional change) of the intermediate transfer belt 61 is detected by the edge sensor 24 and the tilt of the steering roller 63 is appropriately controlled by driving the steering motor 23 based on the detected amount of belt displacement to correct the meandering of the intermediate transfer belt 61.

Referring back to FIG. 10, if the sensor output Va of the first optical sensor 24*e* is greater than the threshold Vth but the sensor output Vb of the second optical sensor 24*f* is less than or equal to the threshold Vth (YES in S7), it can be assumed that the position in the width direction of the intermediate transfer belt 61 is in a range D that is beyond the high-resolution detection range C of the edge sensor 24 in the plus direction. Therefore, in this case, the steering control unit 21 switches to a control step (mode) where the steering motor 23 is controlled by a predetermined control amount so that the intermediate transfer belt 61 shifts in the minus direction of belt displacement (to the left in FIG. 9A) (S8). As a result, the intermediate transfer belt 61 is returned to a position in the belt width direction where the steering control step of S6 can be performed. After the position of the intermediate transfer belt 61 in the belt width direction is returned to the high-resolution detection range C by the above control step (S8), the steering control step of S6 using the differential signal (Vb−Va) can be performed to correct the meandering of the intermediate transfer belt 61.

If the sensor output Vb of the second optical sensor 24*f* is greater than the threshold Vth but the sensor output Va of the first optical sensor 24*e* is less than or equal to the threshold Vth (YES in S9), it can be assumed that the position in the width direction of the intermediate transfer belt 61 is in a range E that is beyond the high-resolution detection range C of the edge sensor 24 in the minus direction. Therefore, in this case, the steering control unit 21 switches to a control step (mode) where the steering motor 23 is controlled by a predetermined control amount so that the intermediate transfer belt 61 shifts in the plus direction of belt displacement (to the right in FIG. 9A) (S10). As a result, the intermediate transfer belt 61 is returned to a position in the belt width direction where the steering control step of S6 can be performed. After the position of the intermediate transfer belt 61 in the belt width direction is returned to the high-resolution detection range C by the above control step (S10), the steering control step of S6 using the differential signal (Vb−Va) can be performed to correct the meandering of the intermediate transfer belt 61.

If the intermediate transfer belt 61 is displaced beyond the high-resolution detection range C, it is not possible to determine the accurate position of the intermediate transfer belt 61 in the belt width direction based on a detection result (the amount of belt displacement) of the edge sensor 24 and to perform a steering control process based on the detection result of the edge sensor 24. In this embodiment, however, even if the intermediate transfer belt 61 is displaced greatly, the direction of displacement of the intermediate transfer belt 61 can be determined based on the sensor outputs Va and Vb of the optical sensors 24*e* and 24*f* without using an additional sensor. Therefore, even if the intermediate transfer belt 61 is displaced beyond the high-resolution detection range C, it is not necessary to immediately stop the intermediate transfer belt 61 and to perform maintenance. Thus, this embodiment makes it possible to reduce the frequency of maintenance.

If both of the sensor outputs Va and Vb of the optical sensors 24*e* and 24*f* are less than or equal to the threshold Vth (NO in S9), error information indicating a sensor output error is reported to an upper controller and a sensor error process is performed to stop the intermediate transfer belt 61 (S11). This is because a situation where both of the sensor outputs Va and Vb are less than or equal to the threshold Vth does not normally occur in this embodiment. A sensor output error is, for example, caused by a break in the harness of the optical sensor 24*e* or 24*f*, failure of the light-emitting part 24*g* or the light-receiving part 24*h*, or a smear on the light-emitting part 24*g* or the light-receiving part 24*h*. When the error information is reported, maintenance is performed to correct the sensor output error.

The control process including steps S4 through S11 is repeated until the image forming process is completed (S12).

According to this embodiment, the edge sensor 24 can be implemented by two inexpensive analog-output optical sensors 24*e* and 24*f*. The edge sensor 24 outputs belt position information represented by a difference between sensor outputs in the detection ranges of the optical sensors 24*e* and 24*f* (the ranges within which the output levels vary according to the displacement of the intermediate transfer belt 61 in the belt width direction, i.e., the ranges where the amount of belt displacement is detectable). This configuration of the edge sensor 24 makes it possible to achieve a detection resolution higher than the detection resolutions of the respective optical sensors 24*e* and 24*f*. In other words, in this embodiment, an overlapping detection range of the optical sensors 24*e* and 24*f* with a relatively low detection resolution and a relatively wide detection range is used as the detection range of the edge sensor 24 to achieve a wide high-resolution detection range C. This configuration makes it possible to achieve a high detection resolution that is not achievable by using a single optical sensor having a detection range with the same width as the high-resolution detection range C.

If a single optical sensor is used to detect the amount of belt displacement and if the intensity of received light in the entire detection range of the optical sensor is reduced due to, for example, a toner smear on the light emitting part 24*g* or the light-receiving part 24*h*, the output level of the optical sensor corresponding to the normal position in the belt width direction of the intermediate transfer belt 61 also decreases and the correspondence between the normal position and the output level of the optical sensor becomes inaccurate. As a result, it becomes difficult to keep the intermediate transfer belt 61 in the normal position in the belt width direction by performing a steering control process and to properly prevent the meandering of the intermediate transfer belt 61. This in turn makes it necessary to frequently perform maintenance to adjust the output level of the optical sensor or to clean the smear. Meanwhile, in this embodiment, since the amount of belt displacement is detected based on a differential signal (Vb−Va) between the sensor outputs Va and Vb of the optical sensors 24*e* and 24*f*, the output level of the differential signal (Vb−Va) corresponding to the normal position in the belt width direction of the intermediate transfer belt 61 remains zero even if the output levels of the optical sensors 24*e* and 24*f* are reduced due to a smear. Thus, with this embodiment, the correspondence between the normal position and the output level of the differential signal is maintained even if the optical sensors 24*e* and 24*f* are smeared over time. This in turn makes it possible to reduce the frequency of maintenance for adjusting the output levels of the optical sensors or cleaning the smear.

<First Variation>

Next, a first variation of the belt meandering preventing method of the above embodiment is described.

In the first variation, descriptions of components and processes that are the same as the above embodiment are omitted.

Figure 11:
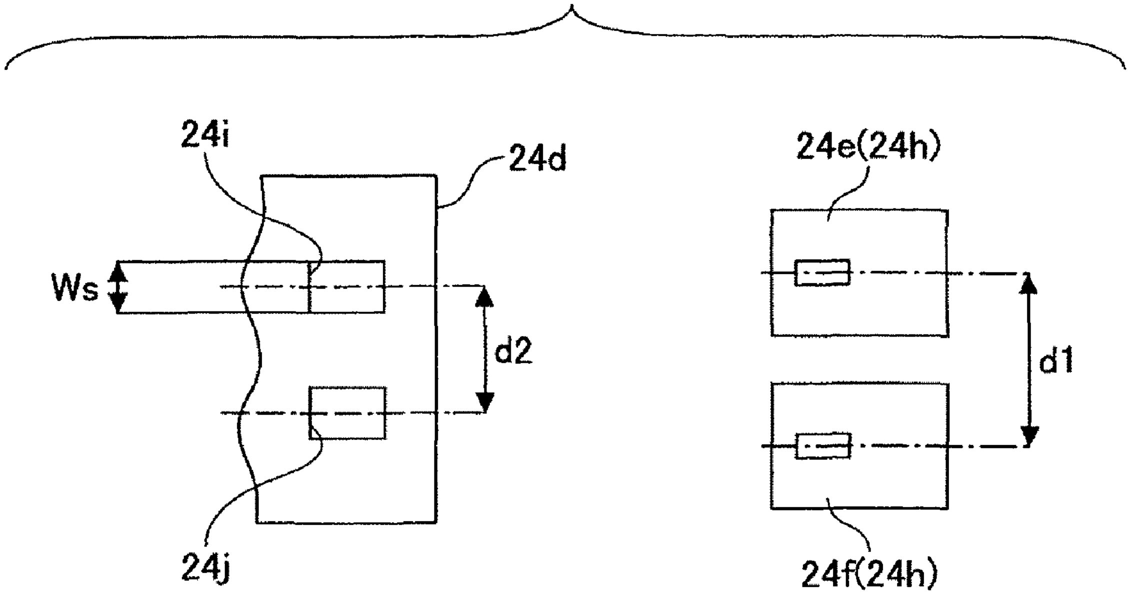
FIG. 11 is a drawing illustrating a configuration of two slits provided in a light-shielding part of a first variation in comparison with the positions of light-receiving parts of two optical sensors.

FIG. 11 is a drawing illustrating a configuration of two slits 24*i* and 24*j* provided in a light-shielding part 24*d* of an arm part of the first variation in comparison with the positions of the light-receiving parts 24*h* of the optical sensors 24*e* and 24*f*.

The first variation is different from the above embodiment in that the slits 24*i* and 24*j* are formed in the light-shielding part 24*d*. In the first variation, a distance d2 between the slits 24*i* and 24*j* is less than a distance d1 between the light-receiving parts 24*h* of the optical sensors 24*e* and 24*f*. However, as long as the detection ranges (the ranges within which the output levels vary according to the displacement of the intermediate transfer belt 61 in the belt width direction) of the optical sensors 24*e* and 24*f* overlap each other and the overlapping detection range has a desired width as the high-resolution detection range, the distance d2 between the slits 24*i* and 24*j* may not be less than the distance d1 between the light-receiving parts 24*h* of the optical sensors 24*e* and 24*f*.

Also, a width Ws (the length in the rotational direction of the arm part) of the slits 24*i* and 24*j* is greater than the width (the length in the rotational direction of the arm part) of the light receiving parts 24*h* of the optical sensors 24*e* and 24*f*.

Figures 12A, 12B, 12C:
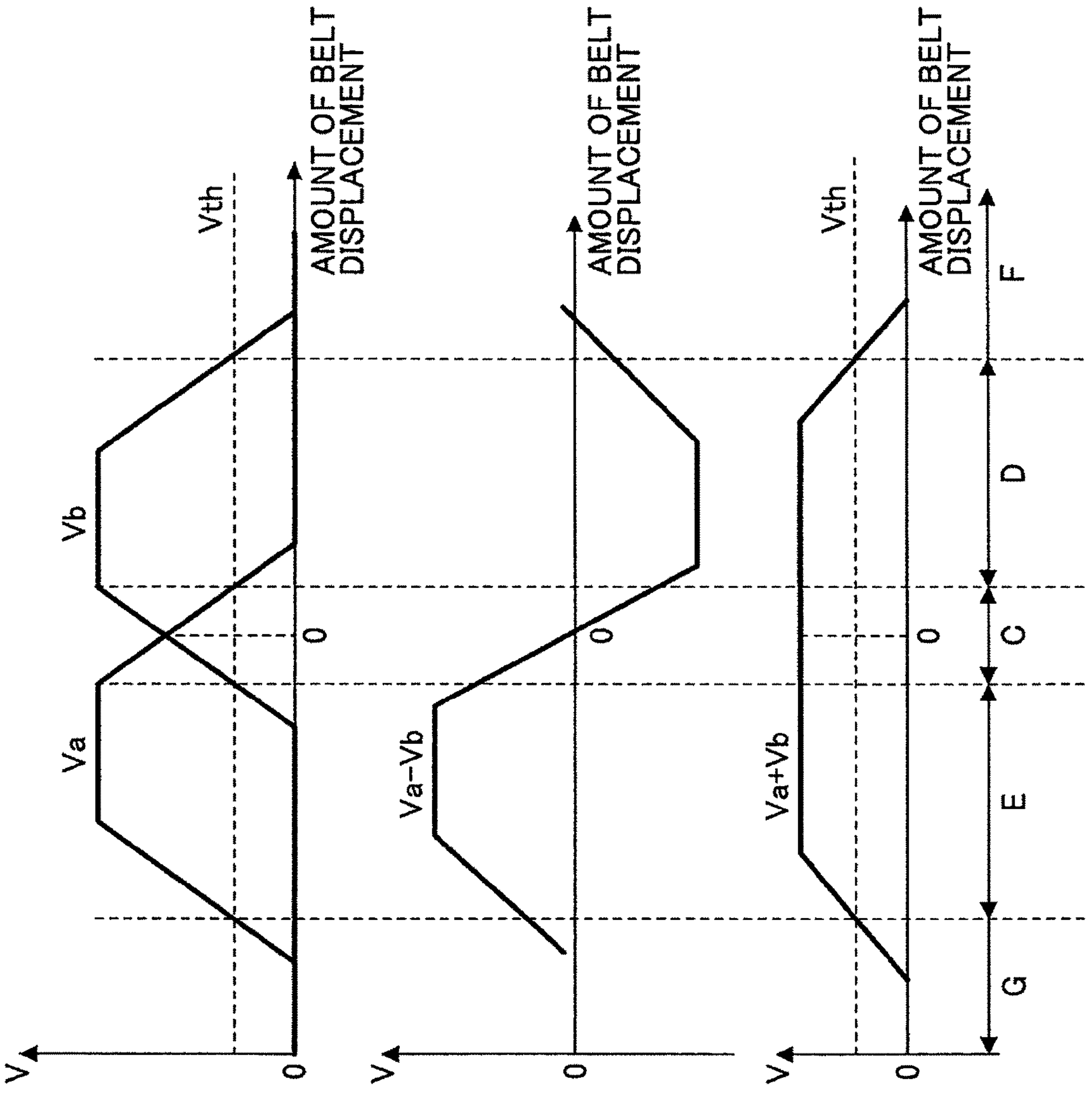
FIG. 12A is a graph showing a relationship between sensor outputs Va and Vb of two optical sensors of the edge sensor and the amount of belt displacement.
FIG. 12C is a graph showing a relationship between the sum (Va+Vb) of the sensor outputs Va and Vb of the two optical sensors and the amount of belt displacement.

FIG. 12A is a graph showing the sensor outputs Va and Vb of the first and second optical sensors 24*e* and 24*f*. In FIG. 12A, the horizontal axis indicates the amount of belt displacement (displacement in the clockwise direction in FIG. 8 is represented by a change in the plus direction and displacement in the counterclockwise direction in FIG. 8 is represented by a change in the minus direction); and the vertical axis indicates the output levels of the sensor outputs Va and Vb.

FIG. 12B is a graph showing the difference (Va−Vb) between the sensor outputs Va and Vb of the optical sensors 24*e* and 24*f*.

FIG. 12C is a graph showing the sum (Va+Vb) of the sensor outputs Va and Vb of the optical sensors 24*e* and 24*f*.

Figure 13C:
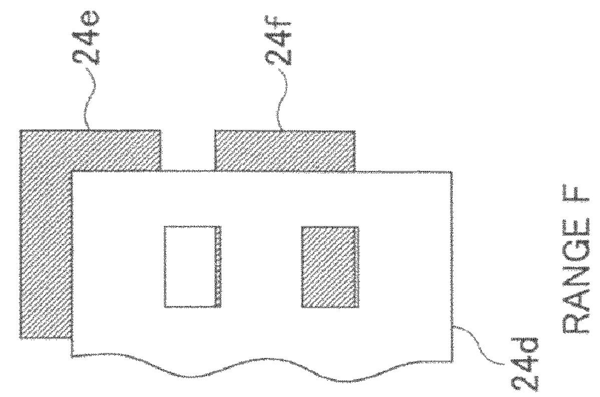
FIG. 13C is a drawing illustrating the position of a light-shielding part relative to light-receiving parts of two optical sensors when the position of an intermediate transfer belt in the belt width direction is in an error range F that is beyond the range D in the plus direction.
Figure 13B:
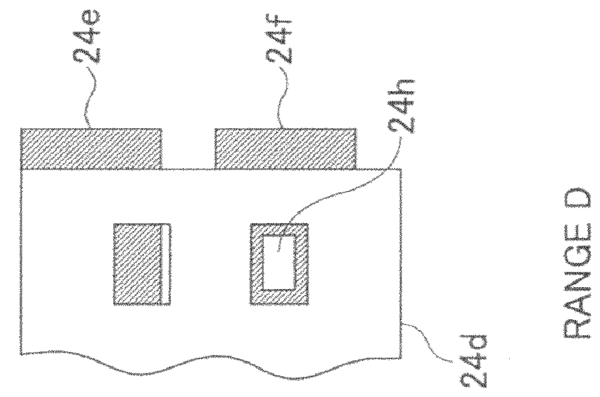
FIG. 13B is a drawing illustrating the position of a light-shielding part relative to light-receiving parts of two optical sensors when the position of an intermediate transfer belt in the belt width direction is in a range D that is beyond a high-resolution detection range C of an edge sensor in the plus direction.
Figure 13A:
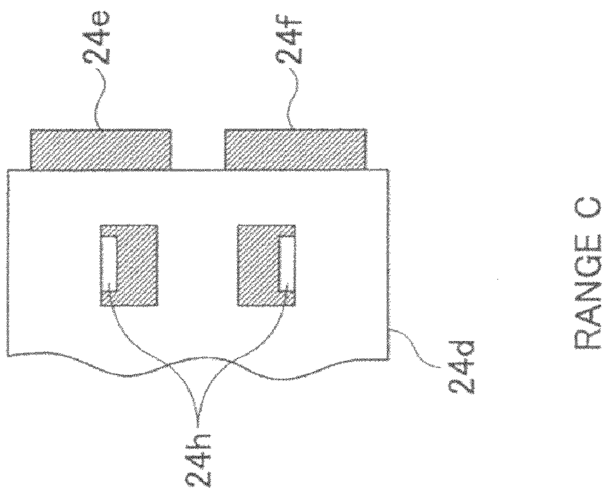
FIG. 13A is a drawing illustrating the position of a light-shielding part relative to light-receiving parts of two optical sensors when the position of an intermediate transfer belt in the belt width direction is in a high-resolution detection range C of an edge sensor.

FIG. 13A is a drawing illustrating the position of the light-shielding part 24*d* relative to the light-receiving parts 24*h* of the optical sensors 24*e* and 24*f* when the position of the intermediate transfer belt 61 in the belt width direction is in the high-resolution detection range C of the edge sensor 24.

FIG. 13B is a drawing illustrating the position of the light-shielding part 24*d* relative to the light-receiving parts 24*h* of the optical sensors 24*e* and 24*f* when the position of the intermediate transfer belt 61 in the belt width direction is in the range D that is beyond the high-resolution detection range C of the edge sensor 24 in the plus direction.

FIG. 13C is a drawing illustrating the position of the light-shielding part 24*d* relative to the light-receiving parts 24*h* of the optical sensors 24*e* and 24*f* when the position of the intermediate transfer belt 61 in the belt width direction is in an error range F that is beyond the range D in the plus direction.

In the first variation, as shown in FIGS. 12A through 12C, five ranges are defined in association with the positional relationships between the slits 24*i* and 24*j* and the light-receiving parts 24*h* of the optical sensors 24*e* and 24*f*. The high-resolution detection range C corresponds to the overlapping detection range of the optical sensors 24*e* and 24*f* where the sensor outputs Va and Vb are both greater than a threshold Vth. In the range D, the sensor output Vb is greater than the threshold Vth but the sensor output Va is less than or equal to the threshold Vth. In the range E, the sensor output Va is greater than the threshold Vth but the sensor output Vb is less than or equal to the threshold Vth. In error ranges F and G, both of the sensor outputs Va and Vb are less than or equal to the threshold Vth. When the sensor outputs are in the high-resolution detection range C, portions of the light-receiving parts 24*h* of the optical sensors 24*e* and 24*f* are in the corresponding slits 24*i* and 24*j*. When the sensor outputs are in the range D, the entire light-receiving part 24*h* of the optical sensor 24*f* is in the slit 24*j*. When the sensor outputs are in the range E, the entire light-receiving part 24*h* of the optical sensor 24*e* is in the slit 24*i*. When the sensor outputs are in the range F or G, neither of the light-receiving parts 24*h* of the optical sensors 24*e* and 24*f* are in the slits 24*i* and 24*j*.

In the first variation, when the intermediate transfer belt 61 is in the normal position (the amount of belt displacement=0) in the belt width direction, the light-shielding part 24*d* is positioned as shown in FIG. 13A with respect to the light-receiving parts 24*h* of the optical sensors 24*e* and 24*f*. If the intermediate transfer belt 61 is displaced in the plus direction of belt displacement from the normal position, a part of the sensor range of the second optical sensor 24*f* enters the slit 24*j* of the light-shielding part 24*d*; and if the intermediate transfer belt 61 further shifts in the plus direction, the entire sensor range (the entire light-receiving part) of the second optical sensor 24*f* enters the slit 24*j* as shown in FIG. 13B. Then, if the intermediate transfer belt 61 is displaced in the plus direction furthermore, the sensor range of the second optical sensor 24*f* exits from the slit 24*j* and is shielded by the light-shielding part 24*d* as shown in FIG. 13C. The position of the light-shielding part 24*d* with respect to the light-receiving parts 24*h* of the optical sensors 24*e* and 24*f* also changes in a similar manner when the intermediate transfer belt 61 moves from the normal position in the minus direction of belt displacement.

As shown by FIG. 12C, the first variation makes it possible to determine that the sensor outputs are in the error range F or G based on the sum (Va+Vb) of the sensor outputs Va and Vb of the optical sensors 24*e* and 24*f*. Even if the intermediate transfer belt 61 is displaced beyond the high-resolution detection range C of the edge sensor 24, the intermediate transfer belt 61 can be returned to the high-resolution detection range C by tilting the steering roller 63 as long as it is in the range D or E and the belt meandering can be prevented without stopping the intermediate transfer belt 61. However, if an overrun occurs and the intermediate transfer belt 61 is displaced to the error range F or G where the intermediate transfer belt 61 may be damaged or come off the support rollers, it is preferable to stop the intermediate transfer belt 61 and perform maintenance. The first variation makes it possible to correctly detect the overrun of the intermediate transfer belt 61 without being influenced by noise by monitoring an event where the sum (Va+Vb) of the sensor outputs Va and Vb becomes lower than or equal to the threshold Vth.

Figure 14:
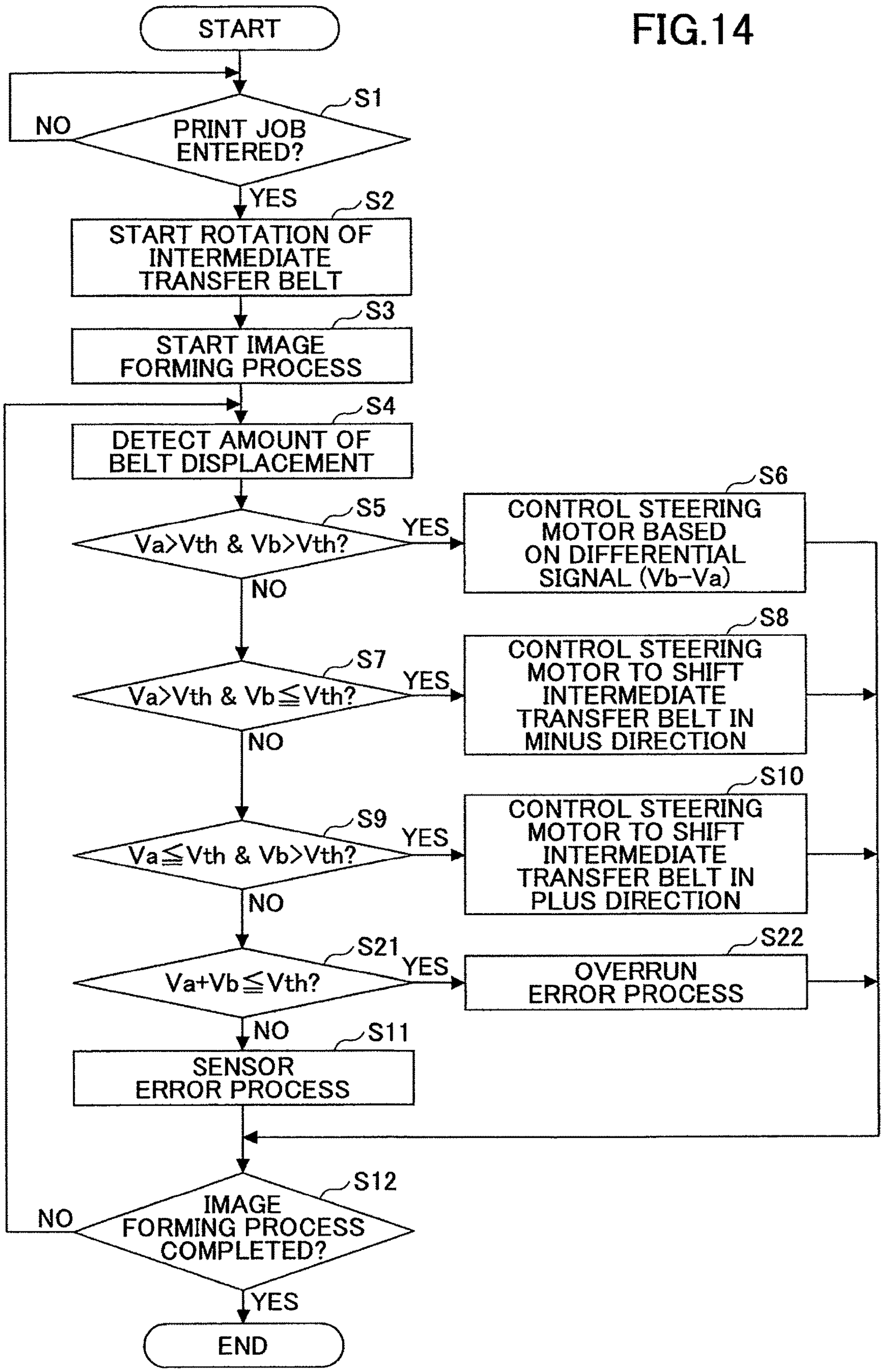
FIG. 14 is a flowchart showing a control process for preventing the belt meandering according to the first variation.

FIG. 14 is a flowchart showing a control process for preventing the belt meandering according to the first variation.

Details of steps that are the same as those in FIG. 10 are omitted in the descriptions below.

In the belt meandering preventing method of the first variation, if the sum (Va+Vb) of the sensor outputs Va and Vb of the optical sensors 24*e* and 24*f* is less than or equal to the threshold Vth (YES in S21), it is assumed that the position of the intermediate transfer belt 61 in the belt width direction is in the error range F or G (an overrun has occurred). In this case, error information indicating the overrun is reported to an upper controller and an overrun error process is performed to stop the intermediate transfer belt 61 (S22). This configuration makes it possible to perform maintenance to correct the overrun.

<Second Variation>

Next, a second variation of the belt meandering preventing method of the above embodiment is described.

Descriptions of components and processes that are the same as those of the above embodiment and the first variation are omitted here.

Figure 15:
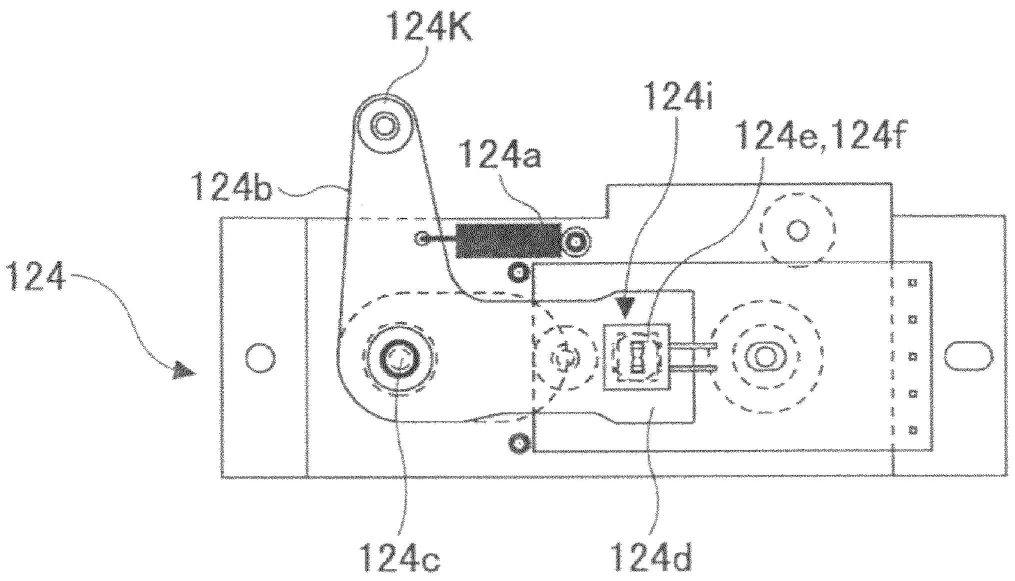
FIG. 15 is an elevational view of an edge sensor according to a second variation.

FIG. 15 is an elevational view of an edge sensor 124 according to the second variation.

Figure 16:
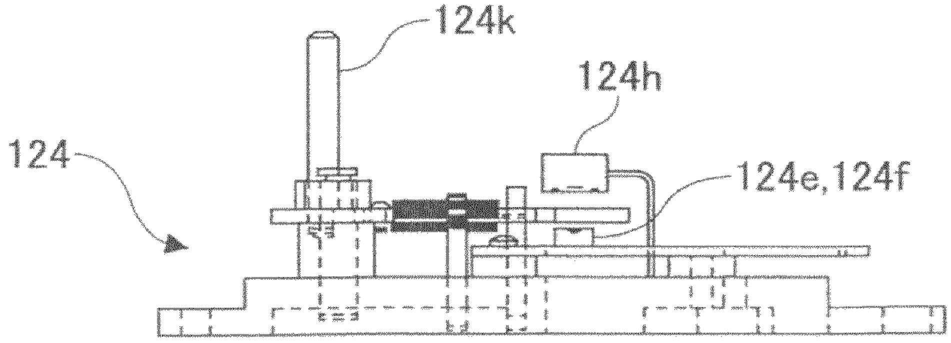
FIG. 16 is a side view of the edge sensor of FIG. 15.

FIG. 16 is a side view of the edge sensor 124 according to the second variation.

The edge sensor 124 of the second variation is different from the edge sensor 24 described above in that a contact part in contact with the side (edge) of the intermediate transfer belt 61 is implemented by a contact pin 124*k* extending from one end of an L-shaped arm part in the axis direction of a spindle 124*c*. Let us assume that the intermediate transfer belt 61 is a resin film having a thickness of 0.05-0.1 mm and made of a high-strength material such as polyimide. In this case, if the contact pin 124*k* is made of a normal resin material, the contact pin 124*k* may be abraded over time by friction with the side of the intermediate transfer belt 61 and it becomes difficult to correctly detect the belt displacement. For this reason, the contact pin 124*k* is preferably made of metal that is hardly abraded by friction with the side of the intermediate transfer belt 61. Also, if the contact pin 124*k* is configured to rotate to prevent the abrasion, it is difficult to obtain accurate detection results. Therefore, the contact pin 124*k* is preferably fixed so as not to rotate.

In the edge sensor 124 of the second variation, two optical sensors are implemented by one light-emitting part 124*h* and a bipartite light-receiving element including light-receiving areas 124*e* and 124*f*. A slit 124*i* is formed in a light-shielding part 124*d*. The width (or the length in the direction of rotation of the arm part around the spindle 124*c*) of the slit 124*i* is substantially the same as the width of each of the light-receiving areas 124*e* and 124*f*. In the second variation, sensor outputs similar to the sensor outputs Va and Vb in the first variation are output from the light-receiving areas 124*e* and 124*f* of the bipartite light-receiving element. Therefore, it is possible to perform a belt meandering preventing process and an overrun error process in a manner similar to the first variation.

Also, since two optical sensors of the edge sensor 124 of the second variation are implemented by one light-emitting part and two light-receiving areas, it is possible to reduce the costs of the edge sensor 124.

To perform the overrun error process, it is necessary to configure the edge sensor 124 to be able to determine whether the position of the intermediate transfer belt 61 in the belt width direction is in the error range F or G based on the sum (Va+Vb) of the sensor outputs Va and Vb and the threshold Vth. In the second variation, the width of the slit 124*i* and the total width of the light-receiving areas 124*e* and 124*f* are adjusted such that it is possible to determine whether the position of the intermediate transfer belt 61 in the belt width direction is in the error range F or G based on the sum (Va+Vb) of the sensor outputs Va and Vb and the threshold Vth.

Also, the width of the high-resolution detection range C of the edge sensor 124 can be adjusted by adjusting the width of the slit 124*i*.

<Third Variation>

Next, a third variation of the belt meandering preventing method of the above embodiment is described.

In the third variation, a light-shielding part of an edge sensor 224 includes one slit 224*i* as in the second variation. However, the edge sensor 224 of the third variation includes three optical sensors, and light-receiving parts of the three optical sensors are implemented by light-receiving areas 224*a*, 224*b*, and 224*c* of a tripartite light-receiving element. Other configurations of the third variation are substantially the same as those of the second variation, and descriptions of those configurations are omitted here.

Figure 17A:
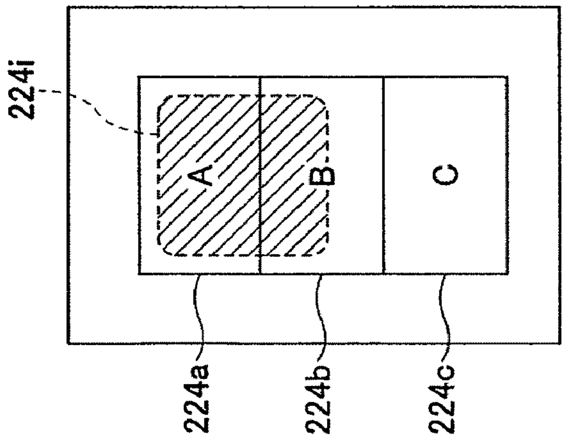
FIGS. 17A through 17C are drawings illustrating a tripartite light-receiving element of an edge sensor according to a third variation.
Figure 17B:
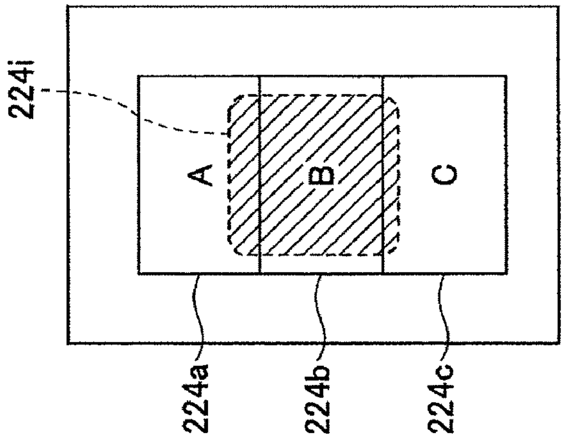
Figure 17C:
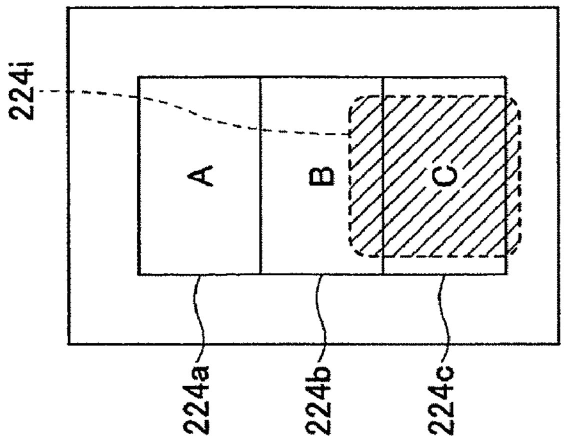

FIGS. 17A through 17C are drawings illustrating a tripartite light-receiving element of the edge sensor 224 of the third variation.

Figure 18A:
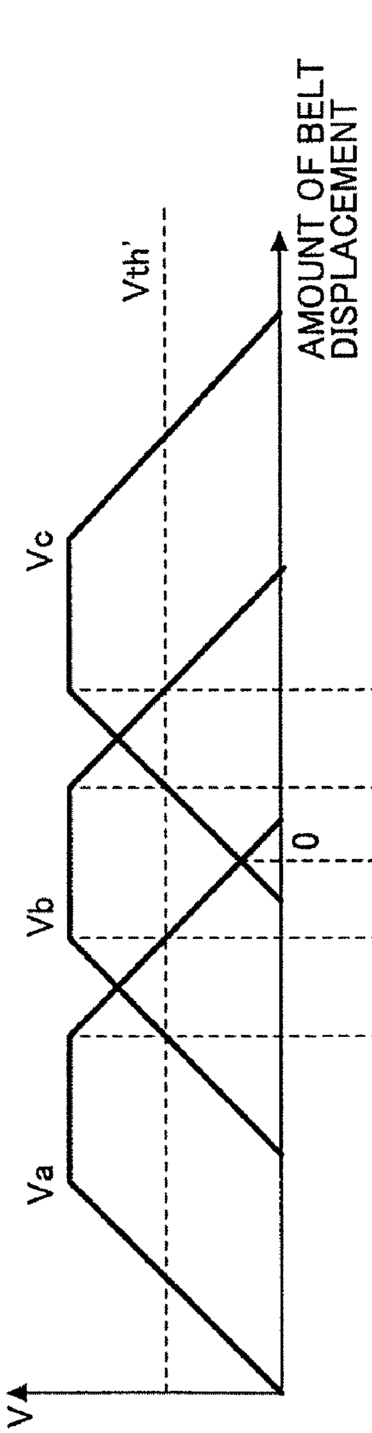
FIG. 18A is a graph showing a relationship between sensor outputs Va, Vb, and Vc of three light-receiving areas of the edge sensor and the amount of belt displacement.

FIG. 18A is a graph showing a sensor output Va from a first light-receiving area 224*a*, a sensor output Vb from a second light-receiving area 224*b*, and a sensor output Vc from a third light-receiving area 224*c*. In FIG. 12A, the horizontal axis indicates the amount of belt displacement (displacement in the clockwise direction in FIG. 8 is represented by a change in the plus direction and displacement in the counterclockwise direction in FIG. 8 is represented by a change in the minus direction); and the vertical axis indicates the output levels of the sensor outputs Va, Vb, and Vc.

Figure 18B:
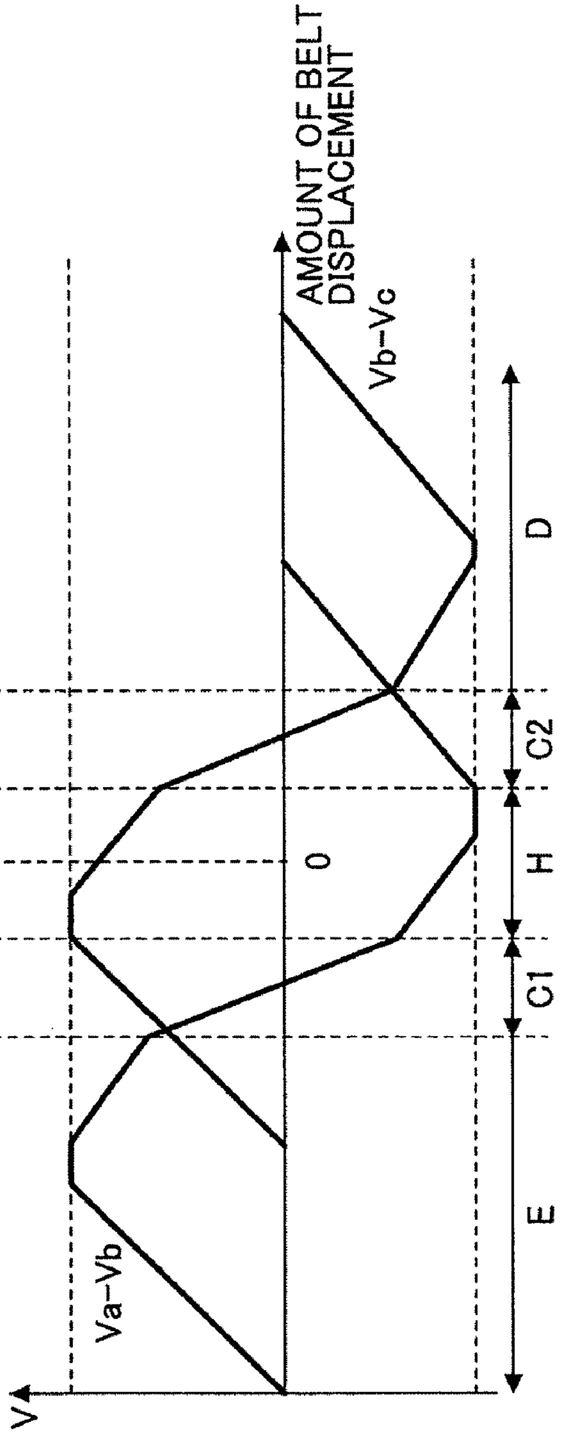
FIG. 18B is a graph showing a relationship between differences (Va−Vb; Vb−Vc) of the sensor outputs Va, Vb, and Vc of the three light-receiving areas and the amount of belt displacement.

FIG. 18B is a graph showing a difference (Va−Vb) between the sensor output Va of the first light-receiving area 224*a* and the sensor output Vb of the second light-receiving area 224*b* and a difference (Vb−Vc) between the sensor output Vb of the second light-receiving area 224*b* and the sensor output Vc of the third light-receiving area 224*c*.

In FIGS. 17A through 17C, an area surrounded by a dotted line indicates the position of the slit 224*i*.

In the third variation, as shown in FIGS. 18A and 18B, five ranges are defined in association with the positional relationships between the slit 224*i* and the light-receiving areas 224*a*, 224*b*, and 224*c*. The five ranges include a high-resolution detection range C1 where the detection ranges of the first light-receiving area 224*a* and the second light-receiving area 224*b* overlap each other; a high-resolution detection range C2 where the detection ranges of the second light-receiving area 224*b* and the third light-receiving area 224*c* overlap each other; a control unnecessary range H between the two high-resolution detection ranges C1 and C2; a range D corresponding to a case where the intermediate transfer belt 61 shifts in the plus direction of belt displacement beyond the high-resolution detection range C2 of the edge sensor 224; and a range E corresponding to a case where the intermediate transfer belt 61 shifts in the minus direction of belt displacement beyond the high-resolution detection range C1 of the edge sensor 224.

When the position of the intermediate transfer belt 61 in the belt width direction is in the high-resolution detection range C1 or C2, the edge sensor 224 of the third variation outputs a differential signal (Va−Vb) or a differential signal (Vb−Vc). Thus, in the high-resolution detection areas C1 and C2, it is possible to detect the amount of belt displacement at a high detection resolution as in the second variation.

When the position of the intermediate transfer belt 61 in the belt width direction is in the control unnecessary range H, it is assumed that the intermediate transfer belt 61 is near the normal position in the belt width direction. Therefore, in the third variation, no steering control process is performed when the position of the intermediate transfer belt 61 in the belt width direction is in the control unnecessary range H, i.e., when the amount of displacement is allowable. Alternatively, the steering control unit 21 may be configured to perform a steering control process based on the sensor output Va of the first light-receiving area 224*a* and/or the sensor output Vc of the light-receiving area 224*c* even when the position of the intermediate transfer belt 61 in the belt width direction is in the control unnecessary range H. In this case, it is not possible to achieve a detection resolution as high as that in the high-resolution detection ranges C1 and C2. Still, however, it is possible to perform an effective steering control process since the amount of belt displacement is small.

When the position of the intermediate transfer belt 61 in the belt width direction is in the range D or E, the belt meandering preventing process is performed in a manner similar to the second variation.

<Fourth Variation>

Next, a fourth variation of the belt meandering preventing method of the above embodiment is described.

In the fourth variation, a width Ds (or the length in the direction of rotation of the arm part around the spindle 124*c*) of the slit 124*i* and a width Dp of each of the light-receiving areas 124*e* and 124*f* are optimized. Other configurations are substantially the same as those of the second variation. In the fourth variation, it is assumed that the width Dp the light-receiving area 124*e* and the width Dp of the light-receiving area 124*f* are the same.

Figure 19:
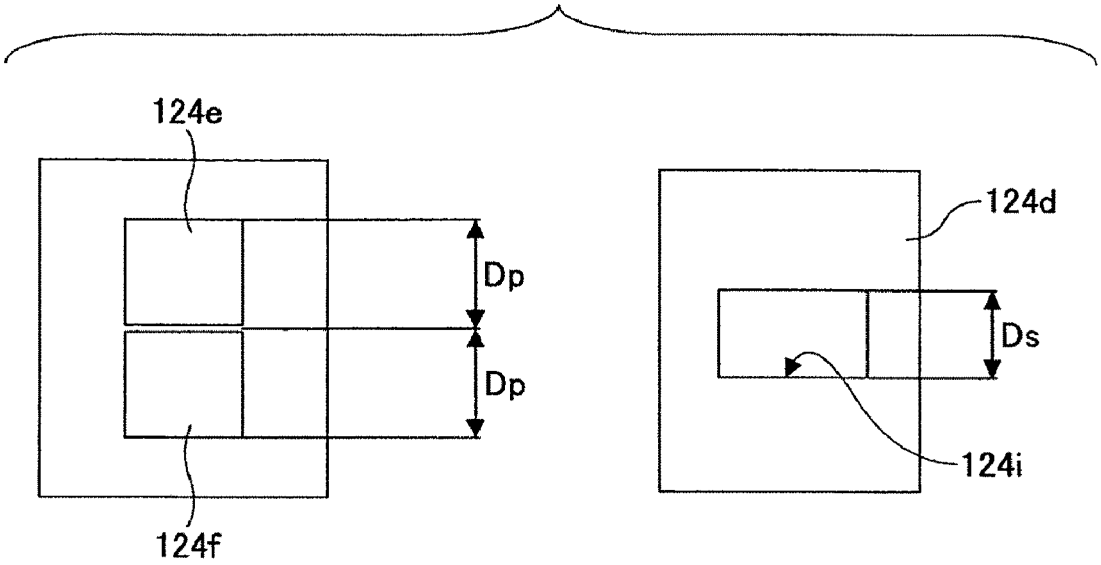
FIG. 19 is a drawing used to describe a slit width Ds and a light-receiving area width Dp in comparison with each other.

FIG. 19 is a drawing used to describe the width Ds (the length in the vertical direction) of the slit 1241 and the width Dp (the length in the vertical direction) of the light-receiving areas 124*e* and 124*f* in comparison with each other.

In the fourth variation, the width Ds of the slit 124*i* and the width Dp of the light-receiving areas 124*e* and 124*f* are determined to satisfy preferably formula (1), more preferably formula (2), and still more preferably formula (3) below.

$$Dp \leqq Ds \leqq 2 \times Dp \quad (1)$$

$$1.5 \times Dp < Ds < 1.8 \times Dp \quad (2)$$

$$Ds \approx 1.7 \times Dp \quad (3)$$

FIG. 20A through 20D are graphs showing approximate output levels of the sensor outputs Va and Vb under conditions (A) through (D) indicating different relationships between the slit width Ds of the slit 124*i* and the width Dp of the light-receiving areas 124*e* and 124*f*.

The condition (A) is Ds<Dp; the condition (B) is Ds=Dp; the condition (C) is Ds=2×Dp; and the condition (D) is Ds>2×Dp.

Figure 20A:
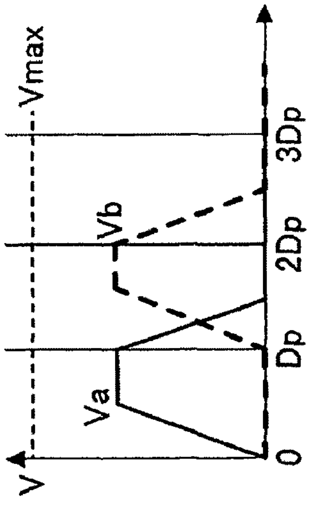
FIG. 20A through 20D are graphs showing approximate output levels of sensor outputs Va and Vb under conditions (A) through (D) indicating different relationships between the slit width Ds and the light-receiving area width Dp.

Under the condition (A) (Ds<Dp), the waveforms of both of the sensor outputs Va and Vb have trapezoidal shapes as shown in FIG. 20A.

After the leading edge of the slit 124*i* in the moving direction reaches the first light-receiving area 124*e*, the received light intensity of the first light-receiving area 124*e* gradually increases and therefore the sensor output Va gradually increases. Under the condition (A), the width Ds of the slit 124*i* is less than the width Dp of the first light-receiving area 124*e*. Therefore, even when the entirety of the slit 124*i* overlaps the first light-receiving area 124*e*, the sensor output Va does not reach a maximum received light intensity Vmax that is output when light is received by the entire first light-receiving area 124*e*. Instead, the sensor output Va remains at a constant voltage less than Vmax until the leading edge of the slit 124*i* moves outside of the first light-receiving area 124*e*. After the leading edge of the slit 124*i* in the moving direction moves outside of the first light-receiving area 124*e*, the received light intensity of the first light-receiving area 124*e* gradually decreases and therefore the sensor output Va gradually decreases.

Meanwhile, after the leading edge of the slit 124*i* in the moving direction reaches the second light-receiving area 124*f*, the received light intensity of the second light-receiving area 124*f* gradually increases and therefore the sensor output Vb gradually increases. Thus, the sensor output Vb shows the same waveform as that of the sensor output Va.

Under the condition (A), the distance that the slit 124*i* moves from the start of the sensor output Va until the end of the sensor output Vb is represented by 2×Dp+Ds.

Figure 20B:
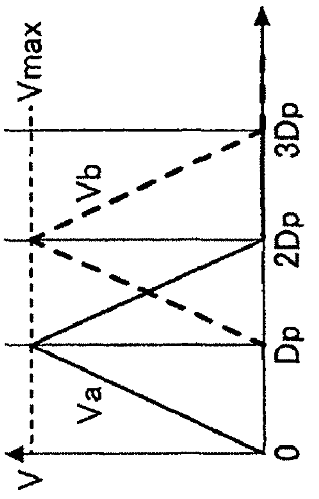

Under the condition (B) (Ds=Dp), the waveforms of both of the sensor outputs Va and Vb have triangular shapes as shown in FIG. 20B.

After the leading edge of the slit 124*i* in the moving direction reaches the first light-receiving area 124*e*, the received light intensity of the first light-receiving area 124*e* gradually increases and therefore the sensor output Va gradually increases. Under the condition (B), since the width Ds of the slit 124*i* is the same as the width Dp of the first light-receiving area 124*e*, the entirety of the first light-receiving area 124*e* can fit in the slit 124*i*. Therefore, light can be received by the entire first light-receiving area 124 and the sensor output Va can reach the maximum received light intensity Vmax. However, since the width Ds of the slit 124*i* is the same as the width Dp of the first light-receiving area 124*e*, a portion of the light-shielding part 124*d* following the rear edge of the slit 124*i* reaches the first light-receiving area 124*e* immediately after the entire first light-receiving area 124*e* enters the slit 124*i*. Therefore, the sensor output Va starts to decrease immediately after it reaches the maximum received light intensity Vmax.

Meanwhile, after the leading edge of the slit 124*i* in the moving direction reaches the second light-receiving area 124*f*, the received light intensity of the second light-receiving area 124*f* gradually increases and therefore the sensor output Vb gradually increases. Thus, the sensor output Vb shows the same waveform as that of the sensor output Va. Under the condition (B), the distance that the slit 124*i* moves from the start of the sensor output Va until the end of the sensor output Vb is represented by 3×Dp (=3×Ds).

Figure 20C:
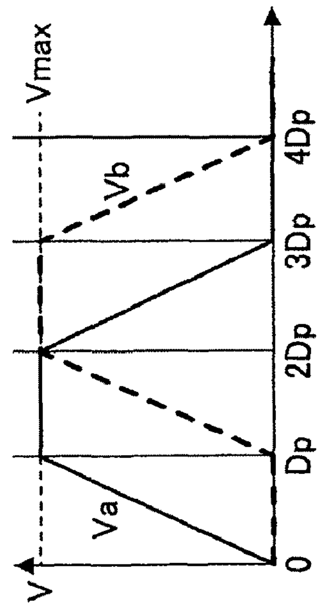

Under the condition (C) (Ds=2×Dp), similarly to the condition (A), the waveforms of both of the sensor outputs Va and Vb have trapezoidal shapes as shown in FIG. 20C. However, under the condition (C), the height of the waveforms (maximum sensor output level) is greater than that in the condition (A).

After the leading edge of the slit 124*i* in the moving direction reaches the first light-receiving area 124*e*, the received light intensity of the first light-receiving area 124*e* gradually increases and therefore the sensor output Va gradually increases. Under the condition (B), since the width Ds of the slit 124*i* is greater than the width Dp of the first light-receiving area 124*e*, light can be received by the entire first light-receiving area 124 while the first light-receiving area 124*e* is in the slit 124*i*. Therefore, the sensor output Va can reach the maximum received light intensity Vmax. Also under the condition (C), since the width Ds of the slit 1241 is two times greater than the width Dp of the first light-receiving area 124*e*, the entire first light-receiving area 124*e* remains in the slit 124*i* from when the first light-receiving area 124*e* enters the slit 124*i* until the slit 124*i* moves a distance corresponding to the width Dp of the first light-receiving area 124*e*. Therefore, the sensor output Va remains at Vmax until a portion of the light-shielding part 124*d* following the rear edge of the slit 124*i* reaches the first light-receiving area 124*e* and gradually decreases thereafter.

Meanwhile, after the leading edge of the slit 124*i* in the moving direction reaches the second light-receiving area 124*f*, the received light intensity of the second light-receiving area 124*f* gradually increases and therefore the sensor output Vb gradually increases. Thus, the sensor output Vb shows the same waveform as that of the sensor output Va.

Under the condition (C), when the center of the slit 124*i* in the moving direction is at the boundary between the light-receiving areas 124*e* and 124*f*, both of the light-receiving areas 124*e* and 124*f* enter the slit 124*i* and both of the sensor outputs Va and Vb reach the maximum received light intensity Vmax.

Also, under the condition (B), the distance that the slit 124*i* moves from the start of the sensor output Va until the end of the sensor output Vb is represented by 4×Dp (=2×Ds).

Figure 20D:
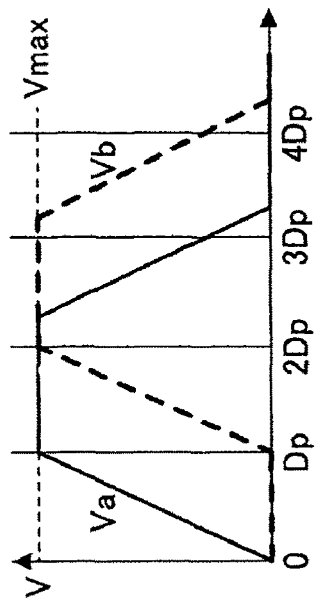

Under the condition (D) (Ds>2×Dp), similarly to the condition (C), the waveforms of both of the sensor outputs Va and Vb have trapezoidal shapes as shown in FIG. 20D. However, under the condition (D), the sensor outputs Va and Vb remain at the maximum received light intensity Vmax concurrently for a certain period of time.

Under the condition (D), since the width Ds of the slit 124*i* is greater than two-fold of the width Dp of the first light-receiving area 124*e*, the entirety of both of the first light-receiving area 124*e* and the second light-receiving area 124*f* can fit in the slit 124*i* for a period of time. Therefore, both of the sensor outputs Va and Vb remain at the maximum received light intensity Vmax for a period of time.

Under the condition (D), the distance that the slit 124*i* moves from the start of the sensor output Va until the end of the sensor output Vb becomes greater than 4×Dp (=2×Ds).

In the fourth variation, similarly to the above embodiment, a difference (Vb−Va) between the sensor outputs Va and Vb is obtained and the differential signal (combined signal) is output to the steering control unit 21 to perform the belt meandering preventing process. The fourth variation makes it possible to improve the detection resolution near the center of the entire detection range and thereby to provide a high-resolution detection range and also makes it possible to detect the amount of belt displacement in adjacent ranges beyond the high-resolution range.

Under the condition (A) where Ds<Dp, the maximum levels of the sensor outputs Va and Vb are lower than the maximum received light intensity Vmax. Therefore, under the condition (A), the detection resolution based on the differential signal (Vb−Va) is lower than the detection resolutions under the conditions (B), (C), and (D) where the sensor outputs Va and Vb reach the maximum received light intensity Vmax. Also under the condition (A), the width Ds of the slit 124*i* is smaller than the width Dp of the light-receiving areas 124*e* and 124*f*. Therefore, a detection possible range (a range from the start point of the sensor output Va to the end point of the sensor output Vb) under the condition (A) is narrower than the detection possible ranges under the conditions (B), (C), and (D) where the width Ds of the slit 124*i* is greater than or equal to the width Dp of the light-receiving areas 124*e* and 124*f*.

Figure 21:
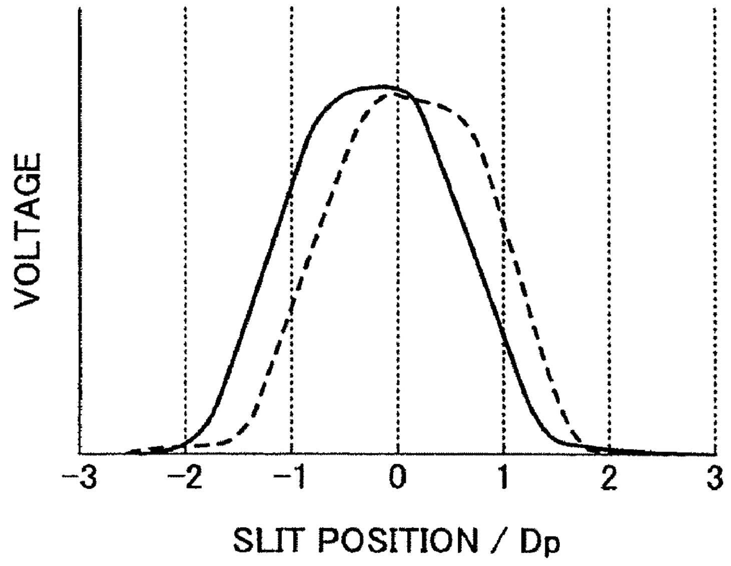
FIG. 21 is a graph showing actual sensor outputs Va and Vb under the condition (D)
Figure 22:
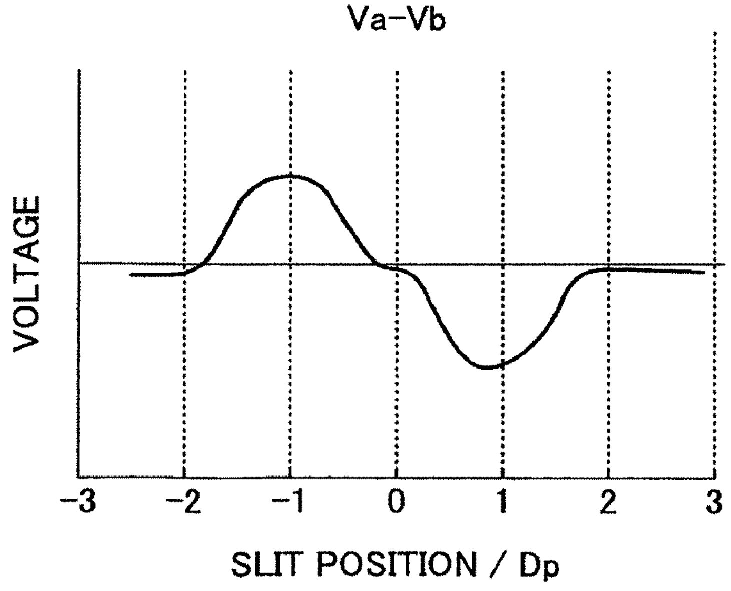
FIG. 22 is a graph showing a differential signal (Vb−Va) between actual sensor outputs Va and Vb under the condition (D)

Under the condition (D) where Ds>2×Dp, since the sensor outputs Va and Vb reach the maximum received light intensity Vmax as shown in FIG. 20D, it is possible to achieve a high detection resolution based on the differential signal (Vb−Va). However, under the condition (D), an output matching range (with a certain width) where both the sensor outputs Va and Vb remain at Vmax exists near the center of the detection possible range (i.e., near the center of the high-resolution detection range). In the output matching range, since the gradient of the differential signal (Vb−Va) (i.e., the detection resolution) becomes zero, it is not possible to detect the position of the intermediate transfer belt 61 in the belt width direction. That is, under the condition (D), a range where the position of the intermediate transfer belt 61 is not detectable exists in the high-resolution detection range. FIG. 21 is a graph showing actual sensor outputs Va and Vb under the condition (D); and FIG. 22 is a graph showing a differential signal (Vb−Va) between the actual sensor outputs Va and Vb shown in FIG. 21. From FIG. 22, it is apparent that the position of the intermediate transfer belt 61 is not detectable near the center of the total detection range (i.e., near the center of the high-resolution detection range).

Meanwhile, under the condition (B) where Ds=Dp and the condition (C) where Ds=2×Dp, since the sensor outputs Va and Vb reach the maximum received light intensity Vmax as shown in FIGS. 20B and 20C, it is possible to achieve a high detection resolution based on the differential signal (Vb−Va). Also under the conditions (B) and (C), the output matching range where both the sensor outputs Va and Vb remain at Vmax does not exist near the center of the detection possible range and therefore the gradient of the differential signal (Vb−Va) (i.e., the detection resolution) does not become zero in the high-resolution detection range. Thus, with the conditions (B) and (C), it is possible to detect the position of the intermediate transfer belt 61 at a high detection resolution within the entire high-resolution detection range.

For the above reasons, in the fourth variation, the width Ds of the slit 124*i* and the width Dp of the light-receiving areas 124*e* and 124*f* are determined to satisfy formula (1) Dp≦Ds≦2×Dp described above.

Figures 23A, 23B:
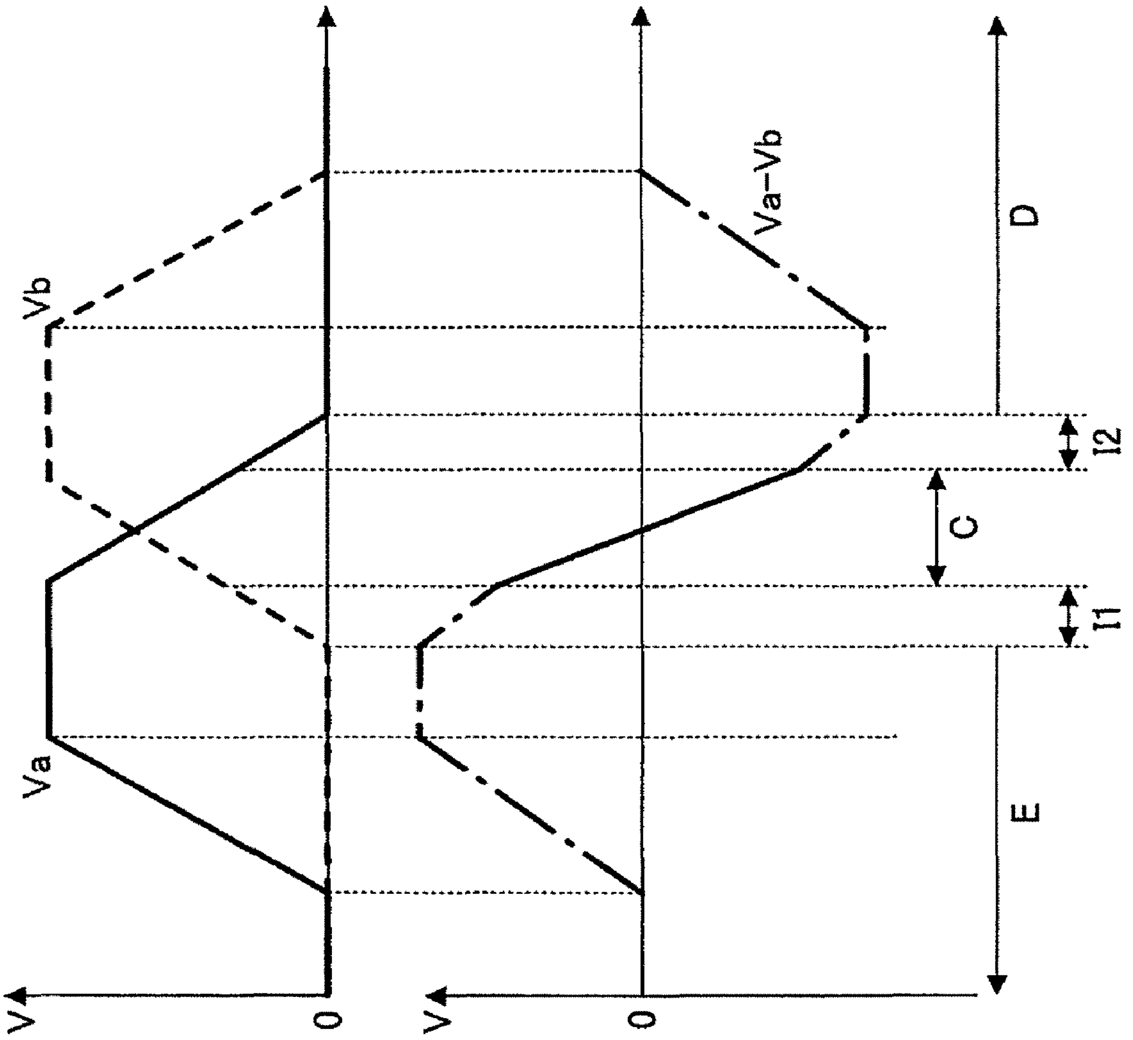
FIG. 23A is a graph showing approximate output levels of sensor outputs Va and Vb when $Ds \approx 1.7 \times Dp$ is true.
FIG. 23B is a graph showing a differential signal (Vb−Va) between the sensor-outputs Va and Vb shown in FIG. 23A.

FIG. 23A is a graph showing approximate output levels of sensor outputs Va and Vb when formula (3) which is more preferable than formula (1) is true.

FIG. 23B is a graph showing a differential signal (Vb−Va) between the sensor outputs Va and Vb shown in FIG. 23A.

When the condition (B) Ds=Dp and the condition (C) Ds=2×Dp are compared, the detection resolution in the high-resolution detection range C obtained based on the differential signal (Vb−Va) under the condition (B) is greater than that under the condition (C), but the width of the high-resolution detection range C under the condition (B) is narrower than that under the condition (C). That is, under the condition of formula (1) (Dp≦Ds≦2×Dp), the detection resolution becomes higher and the width of the high-resolution detection range C becomes narrower as the relationship between the width Ds of the slit 124*i* and the width Dp of the light-receiving areas 124*e* and 124*f* becomes closer to the condition (B); and the detection resolution becomes lower and the width of the high-resolution detection range C becomes wider as the relationship becomes closer to the condition (C). Meanwhile, under the condition of formula (1) (Dp≦Ds≦2×Dp), normal-resolution detection ranges I1 and I2 providing a detection resolution corresponding to the detection resolution of the respective sensor outputs Va and Vb are present adjacent to the high-resolution detection range C. The normal-resolution detection ranges I1 and I2 do not provide a detection resolution as high as that in the high-resolution detection range C, but still provide a detection resolution that corresponds to the detection resolution of the respective sensor outputs Va and Vb. Also, under the condition of formula (1) (Dp≦Ds≦2×Dp), the normal-resolution detection ranges I1 and I2 become wider as the high-resolution detection range C becomes narrower. Therefore, it is possible to adjust the balance between the width of the high-resolution detection range C and the width of the detection possible range by adjusting the relationship between the width Ds of the slit 124*i* and the width Dp of the light-receiving areas 124*e* and 124*f* within the range of formula (1) (Dp≦Ds≦2×Dp). In the fourth variation, the optimum relationship between the width of the high-resolution detection range C and the width of the detection possible range is achieved when formula (3) (Ds≈1.7×Dp) is satisfied.

<Fifth Variation>

Next, a fifth variation of the belt meandering preventing method of the above embodiment is described.

In the fifth variation, instead of the differential signal (Vb−Va) between the sensor outputs Va and Vb, a signal representing a ratio ((Va−Vb)/(Va+Vb)) of the difference (Va−Vb) between the sensor outputs Va and Vb to the sum (Va+Vb) of the sensor outputs Va and Vb is used by the steering control unit 21 for the belt meandering preventing process. Other configurations are substantially the same as those of the fourth variation.

Figure 24A:
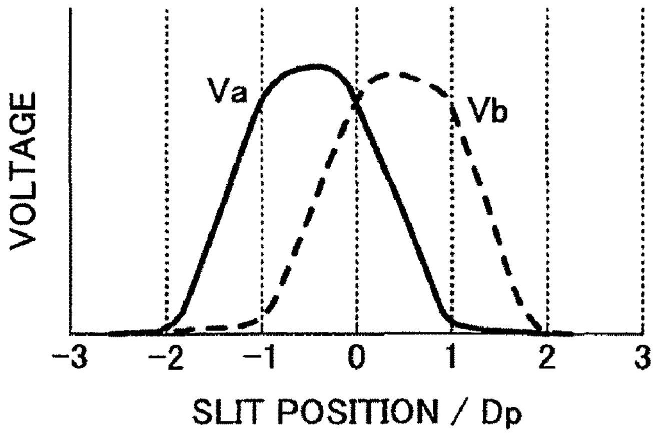
FIG. 24A is a graph showing exemplary output levels of two sensor outputs Va and Vb according to a fifth variation.

FIG. 24A is a graph showing exemplary output levels of the sensor outputs Va and Vb.

Figure 24B:
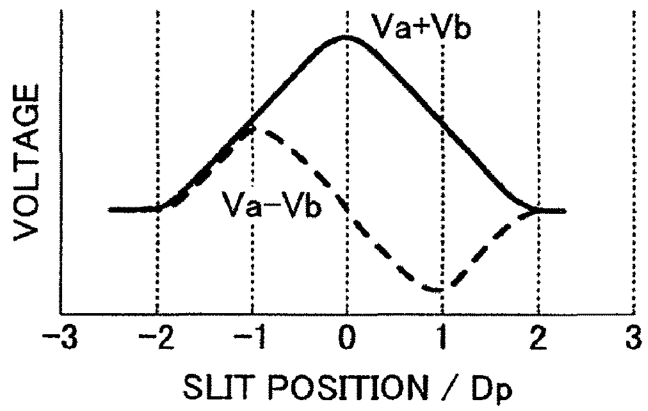
FIG. 24B is a graph showing a differential signal (Va−Vb) and a sum signal (Va+Vb) of the sensor outputs Va and Vb shown in FIG. 24A.

FIG. 24B is a graph showing a differential signal (Va−Vb) and a sum signal (Va+Vb) of the sensor outputs Va and Vb shown in FIG. 24A.

Figure 24C:
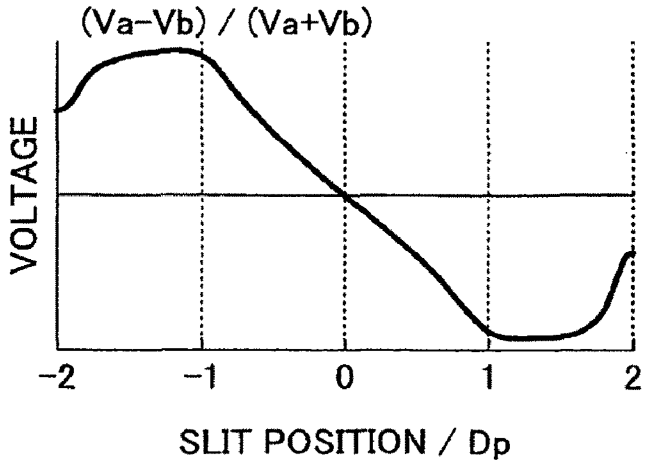
FIG. 24C is a graph showing a ratio (Va−Vb)/(Va+Vb) of the differential signal (Va−Vb) to the sum signal (Va+Vb) shown in FIG. 24B.

FIG. 24C is a graph showing a ratio (Va−Vb)/(Va+Vb) of the differential signal (Va−Vb) to the sum signal (Va+Vb) shown in FIG. 24B.

As described above, when the belt meandering preventing process is performed using a differential signal under the condition of formula (1), the normal-resolution detection ranges I1 and I2 providing a detection resolution lower than the detection resolution of the high-resolution detection range C are present adjacent to the high-resolution detection range C. Therefore, the detection resolution changes at the boundary between the high-resolution detection range C and the normal-resolution detection ranges I1 and I2 and as a result, the linearity of the detection resolution in the detection possible range becomes poor. In an actual case, even if the detection resolution is high in a part of the detection possible range but the linearity of the detection resolution in the detection possible range is poor, it is difficult to stably perform the belt meandering preventing process.

For this reason, in the fifth variation, a ratio signal ((Va−Vb)/(Va+Vb)) indicating a ratio of the differential signal (Va−Vb) to the sum signal (Va+Vb) is used instead of the differential signal (Vb−Va) to perform the belt meandering preventing process. As shown in FIG. 24B, the level of the sum signal (Va+Vb) is high at its center and the gradient of the sum signal is small near the highest point. Because of the small gradient of the sum signal (Va+Vb), the detection resolution near the center of the ratio signal ((Va−Vb)/(Va+Vb)) is lower than the detection resolution in the high-resolution detection range C of the differential signal (Va−Vb). Meanwhile, the detection resolution in other parts of the detection possible range of the ratio signal ((Va−Vb)/(Va+Vb)) is higher than the detection resolution in the normal-resolution detection ranges I1 and I2 (i.e., a detection resolution corresponding to the detection resolution of the respective sensor outputs Va and Vb). Therefore, it is possible to obtain a signal providing a high detection resolution and good linearity in the entire detection possible range by adjusting the range near the highest point of the sum signal (Va+Vb) where the gradient is small to match the high-resolution detection range C at the center of the differential signal (Va−Vb).

<Sixth Variation>

Next, a sixth variation of the belt meandering preventing method of the above embodiment is described. In the sixth variation, the belt meandering preventing method of the fourth variation or the fifth variation is performed by using the light-receiving parts 24*h* of the optical sensors 24*e* and 24*f* described in the first variation instead of the bipartite light-receiving element. The relationship among the distance d1 between the light-receiving parts 24*h* of the optical sensors 24*e* and 24*f*, the distance d2 between the slits 24*i* and 24*j*, and the width Dp of the light-receiving areas 124*e* and 124*f* are determined to satisfy formula (4) below.

$$d2-d1=Dp \quad (4)$$

Figure 25:
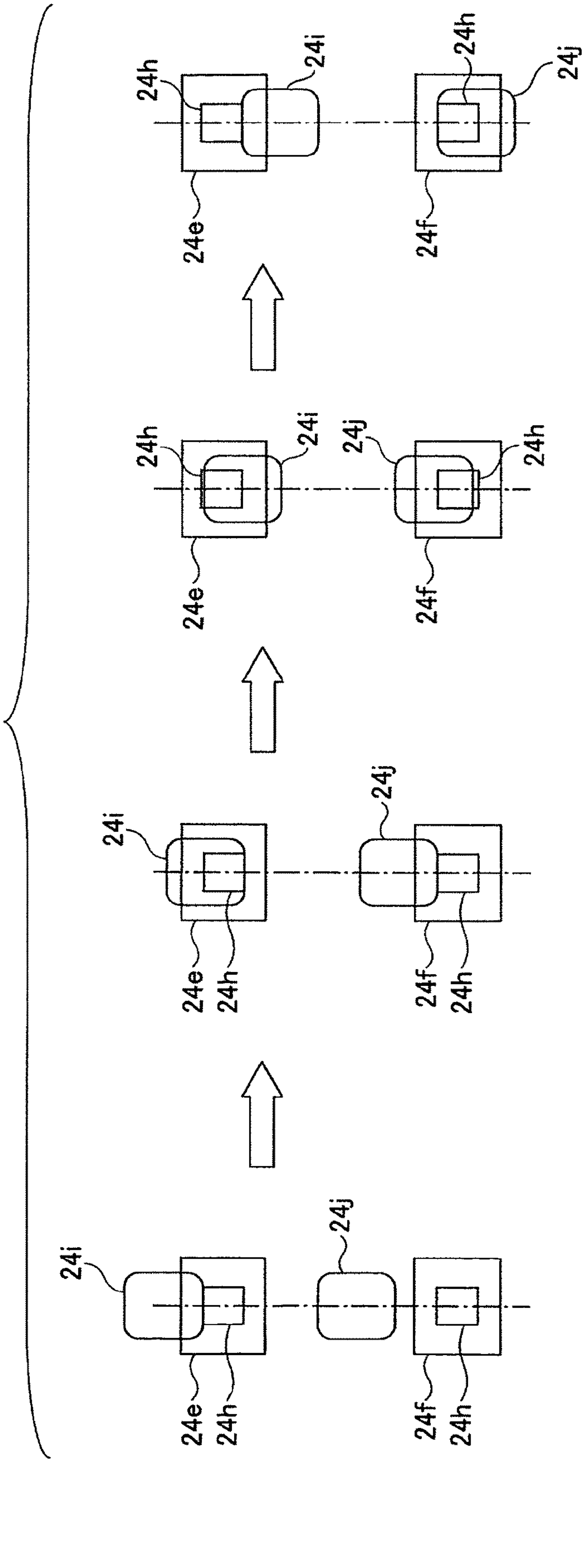
FIG. 25 is a drawing illustrating positional relationships between two slits and two light-receiving areas according to a sixth variation.

As a result, the positional relationships between the slits 24*i* and 24*j* and the light-receiving parts 24*h* of the optical sensors 24*e* and 24*f* become as shown in FIG. 25, and the sensor outputs of the optical sensors 24*e* and 24*f* become similar to the sensor outputs in the fourth variation or the fifth variation.

<Seventh Variation>

Next, a seventh variation of the belt meandering preventing method of the above embodiment is described.

In the seventh variation, in addition to a threshold Vth (hereafter called an overrun threshold Vth) for detecting an overrun, a second threshold Vthsens (hereafter called a sensor failure threshold Vthsens) for detecting failure of sensors is used in the belt meandering preventing process performed by the steering control unit 21. Other configurations are substantially the same as those of the first variation.

Figure 26A:
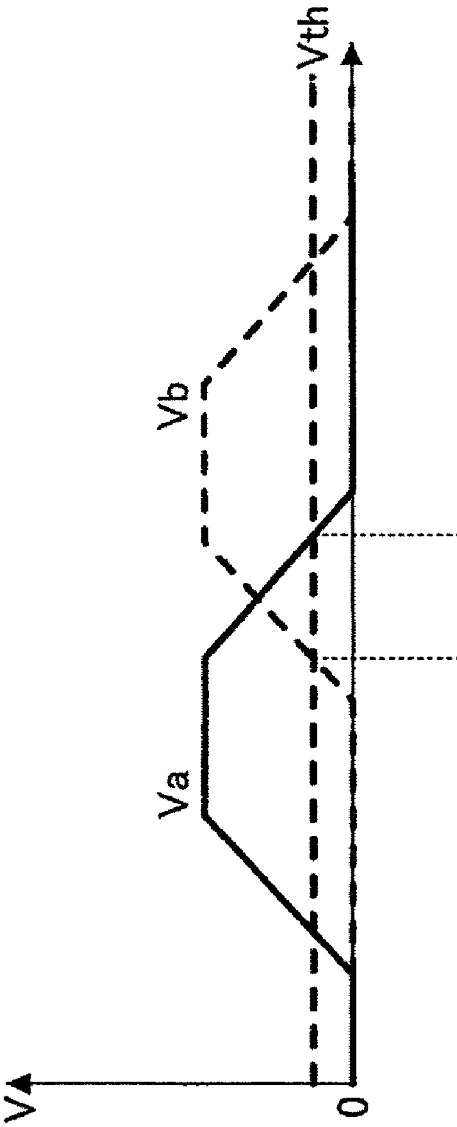
FIG. 26A is a graph where the horizontal axis indicates the amount of belt displacement and the vertical axis indicates sensor output levels of two optical sensors according to a seventh variation.

FIG. 26A is a graph where the horizontal axis indicates the amount of belt displacement and the vertical axis indicates output levels of the sensor outputs Va and Vb of the optical sensors 24*e* and 24*f*.

Figure 26B:
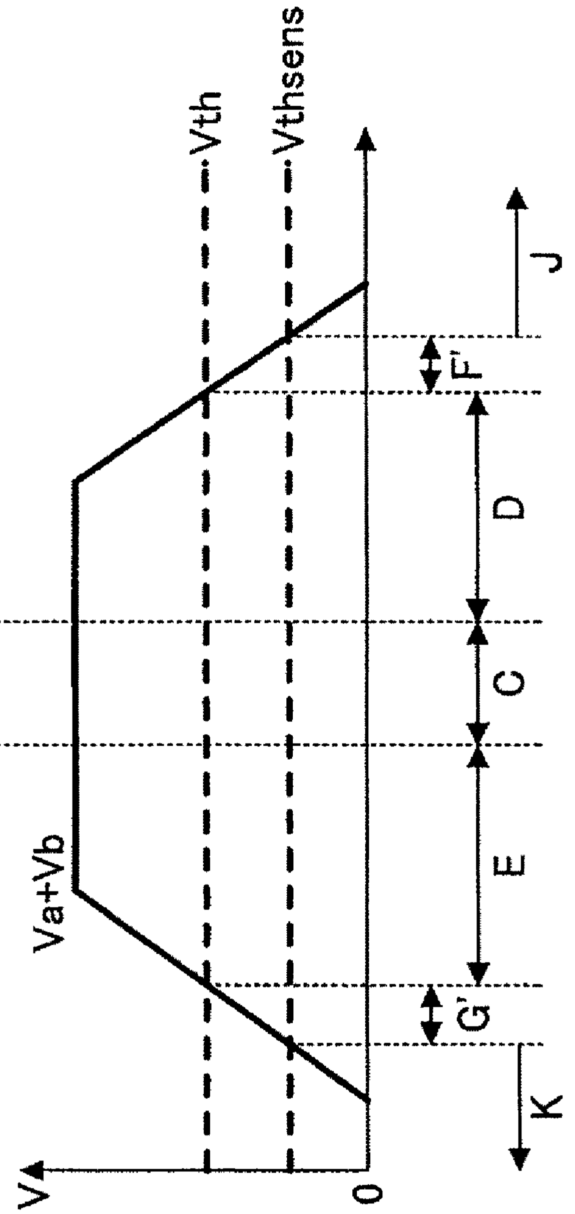
FIG. 26B is a graph showing the sum (Va+Vb) of the sensor outputs and two thresholds Vth and Vthsens.

FIG. 26B is a graph showing the sum (Va+Vb) of the sensor outputs Va and Vb and the thresholds Vth and Vthsens.

In the seventh variation, as shown in FIGS. 26A and 26B, two thresholds Vth and Vthsens are used and seven ranges are defined in association with the positional relationships between the slits 24*i* and 24*j* and the light-receiving parts 24*h* of the optical sensors 24*e* and 24*f*. In other words, two ranges are added to the five ranges defined in the first variation. The seven ranges include a high-resolution detection range C that corresponds to the overlapping detection range of the optical sensors 24*e* and 24*f* where the sensor outputs Va and Vb are both greater than the overrun threshold Vth; a range D where the sensor output Vb is greater than the overrun threshold Vth but the sensor output Va is less than or equal to the overrun threshold Vth; a range E where the sensor output Va is greater than the overrun threshold Vth but the sensor output Vb is less than or equal to the overrun threshold Vth; overrun ranges F' and G' where both of the sensor outputs Va and Vb are greater than the sensor failure threshold Vthsens but are less than or equal to the overrun threshold Vth; and failure ranges J and K where both of the sensor outputs Va and Vb are less than or equal to the sensor failure threshold Vthsens.

Thus, in the seventh variation, the error ranges in the first variation are further divided into the overrun ranges F' and G' and the sensor failure ranges J and K so that the cause of an error can be narrowed down based on sensor outputs.

Figure 27:
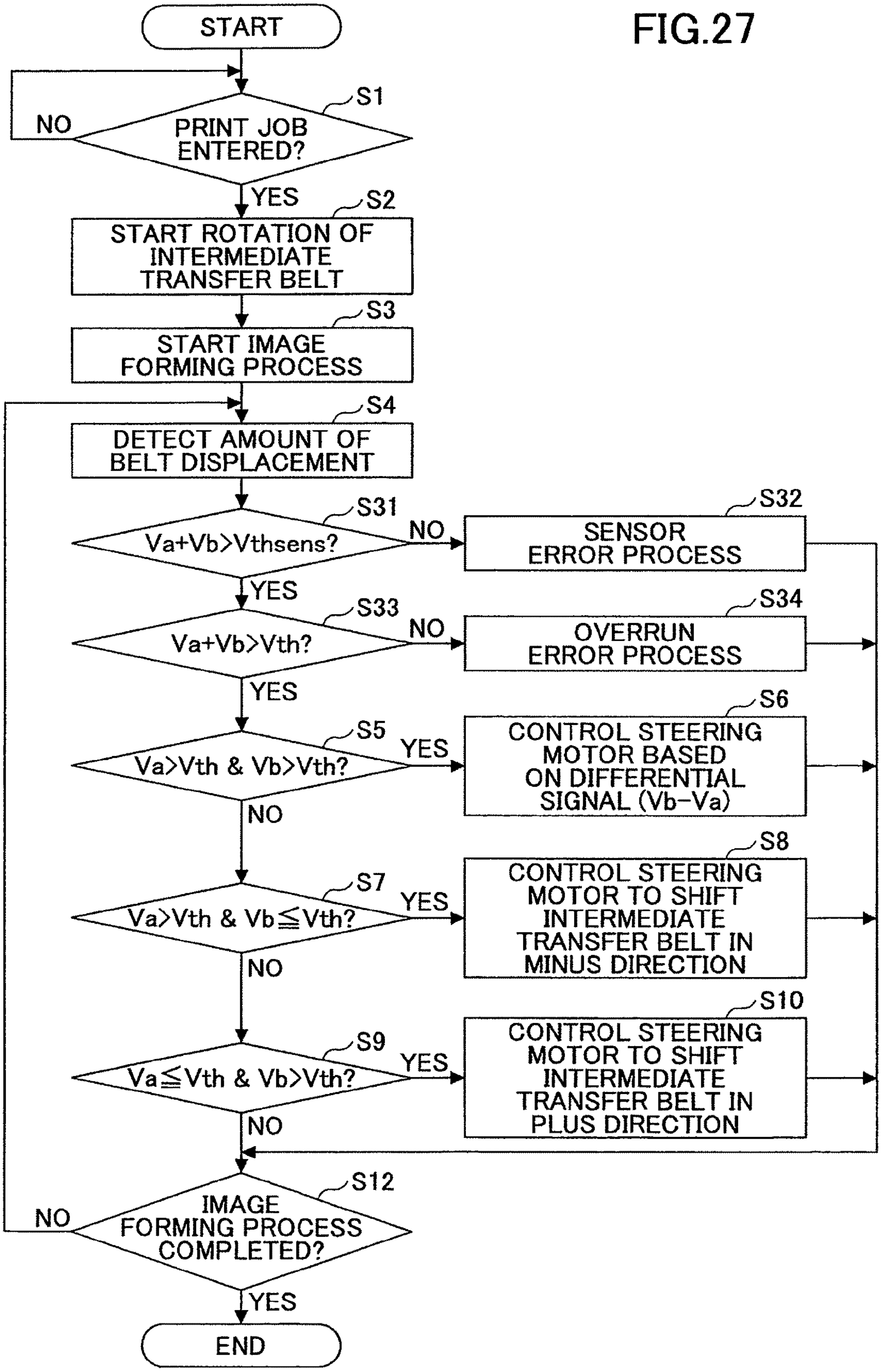
FIG. 27 is a flowchart showing a control process for preventing the belt meandering according to the seventh variation.

FIG. 27 is a flowchart showing a control process for preventing the belt meandering according to the seventh variation.

In the seventh variation, after the amount of belt displacement is detected (S4), the steering control unit 21 determines whether the sum (Va+Vb) of the sensor outputs Va and Vb of the optical sensors 24*e* and 24*f* is greater than the sensor failure threshold Vthsens (S31). If the sum (Va+Vb) is less than or equal to the sensor failure threshold Vthsens (NO in S31), the steering control unit 21 performs a sensor error process to output failure information indicating sensor failure (S32) and thereby to allow the user, for example, to replace the optical sensors 24*e* and 24*f*. If the sum (Va+Vb) is greater than the sensor failure threshold Vthsens (YES in S31), the steering control unit 21 determines whether the sum (Va+Vb) is greater than the overrun threshold Vth (S33). If the sum (Va+Vb) is less than or equal to the overrun threshold Vth (NO in S33), the steering control unit 21 performs the overrun error process described in the first variation (S34). If the sum (Va+Vb) is greater than the overrun threshold Vth (YES in S33), the steering control unit 21 controls the steering motor 23 as described in the above embodiment.

The printer according to the embodiment and its variations described above includes the intermediate transfer belt 61 that is an endless belt stretched over the support rollers 63, 67, 68, 69, and 71. An image formed on the outer surface of the intermediate transfer belt 61 is transferred onto the recording paper P. The printer also includes a belt meandering preventing device including the edge sensor 24 (124, 224) used as a belt displacement detection unit for detecting the amount of belt displacement of the intermediate transfer belt 61 in the belt width direction and the steering control unit 21 used as a belt meandering correction unit for correcting the displacement of the intermediate transfer belt 61 in the belt width direction based on the detected amount of belt displacement. The edge sensor 24 (124, 224) includes the arm part used as a moving part that moves in association with the displacement of the intermediate transfer belt 61 in the belt width direction; and the optical sensors 24*e* and 24*f* (124*e* and 124*f*; 224*a*, 224*b*, and 224*c*) that output signals with output levels corresponding to the proportions of the light-shielding part 24*d* (124*d*) of the arm part in the optical paths of the optical sensors. The optical sensors are arranged such that their output levels change as the intermediate transfer belt 61 is displaced in the belt width direction within the high-resolution detection range C (C1, C2). The output signals of the optical sensors are combined such that the rate of change of the output level of the combined signal Vb−Va (Va−Vb, Vb−Vc) with respect to the amount of belt displacement of the intermediate transfer belt 61 in the belt width direction within the high-resolution detection range C (C1, C2) becomes greater than the rates of change of the output levels of the respective optical sensors. The combined signal is output as the amount of belt displacement (belt position information). This configuration makes it possible to achieve a wide high-resolution detection range C (C1, C2) with a high detection resolution using the edge sensor 24 (124, 224) implemented by inexpensive optical sensors.

Also, according to the embodiment and its variations described above, each of the optical sensors 24*e* and 24*f* (124*e* and 124*f*; 224*a*, 224*b*, and 224*c*) of the edge sensor 24 (124, 224) is configured to output a signal with the maximum output level when the position of the intermediate transfer belt 61 in the belt width direction is in a range that is beyond one end of the high-resolution detection range C (C1, C2) and to output a signal with the minimum output level when the position of the intermediate transfer belt 61 in the belt width direction is in a range that is beyond the other end of the high-resolution detection range C (C1, C2). This configuration makes it possible to determine the direction of displacement of the intermediate transfer belt 61 based on the sensor outputs of the optical sensors without using additional sensors even when the intermediate transfer belt 61 is displaced beyond the high-resolution detection range C (C1, C2). Accordingly, even if the intermediate transfer belt 61 is displaced beyond the high-resolution detection range C (C1, C2), this configuration makes it possible to correct the displacement of the intermediate transfer belt 61 to return the intermediate transfer belt 61 to the high-resolution detection range C (C1, C2), instead of stopping the intermediate transfer belt 61 and performing maintenance. Thus, this configuration makes it possible to reduce the frequency of maintenance.

According to the second and third variations, the optical sensors of the edge sensor 124 (224) are implemented by an optical sensor unit including one light-emitting part 124*h* and the light-receiving parts 124*e* and 124*f* (224*a*, 224*b*, and 224*c*) that output signals with output levels corresponding to the proportions of the light-shielding part 124*d* of the arm part in the optical paths of light emitted from the light-emitting part 124*h*. This configuration makes it possible to reduce the costs of the edge sensor 124 (224).

In the first and second variations, the light-shielding part 24*d* (124*d*) may have the light-passing slits 24*i* and 24*j* (or the light-passing slit 124*i*); and the optical sensors 24*e* and 24*f* (124*e* and 124*f*) of the edge sensor 24 (124) may be implemented by transmissive optical sensors that output signals with output levels corresponding to the proportions of the light-shielding part 24*d* (124*d*) shielding the optical paths. The transmissive optical sensors may be arranged such that when the rear edge of one of the light-passing slits, in terms of the moving direction of the light-shielding part 24*d* (124*d*) when the intermediate transfer belt 61 is displaced in one belt width direction in the high-resolution detection range C, is substantially at the center of one of the transmissive optical sensors, the leading edge of the same light-passing slit or the leading edge of the other light-passing slit is located substantially at the center of the other one of the transmissive optical sensors. This configuration makes it possible to maximize the width of the high-resolution detection range C.

If the output levels of both of the transmissive optical sensors 24*e* and 24*f* (124*e* and 124*f*) are greater than the threshold Vth, a combined signal, which is a differential signal (Vb−Va, Va−Vb) between the output signals of the transmissive optical sensors 24*e* and 24*f* (124*e* and 124*f*), is used to determine the amount of belt displacement (belt position information). Meanwhile, if one of the output levels of the transmissive optical sensors 24*e* and 24*f* (124*e* and 124*f*) is less than or equal to the threshold Vth, a signal with the maximum output level of one of the transmissive optical sensors 24*e* and 24*f* (124*e* and 124*f*) having the higher output level is used to determine the amount of belt displacement (belt position information). Using the threshold Vth makes it possible to remove noise from sensor outputs and thereby to stably perform a belt meandering preventing process.

Also, if both of the output levels of the transmissive optical sensors 24*e* and 24*f* (124*e* and 124*f*) are less than or equal to the threshold Vth, the steering control unit 21 outputs an error signal indicating a sensor error, i.e., functions as an error signal outputting unit. The error signal allows the user to perform maintenance to correct the sensor error.

Also in the first and second variations, when both of the output levels of the transmissive optical sensors 24*e* and 24*f* (124*e* and 124*f*) are greater than the threshold Vth, an adjustment signal, which is the sum signal (Va+Vb) of the outputs signals of the transmissive optical sensors 24*e* and 24*f* (124*e* and 124*f*), may be generated and the light intensity of the light-emitting parts 24*g* (or the light-emitting part 124*h*) may be adjusted based on the adjustment signal. In this case, the steering control unit 21 also functions as a light intensity adjusting unit.

In the fourth variation, the edge sensor 124 includes the light-receiving parts 124*e* and 124*f* that output signals with output levels corresponding to the proportions of the light-shielding part 124*d* having the light-passing slit 124*i* in the optical paths of light emitted from the light-emitting part 124*h*. The light-receiving parts 124*e* and 124*f* are arranged next to each other along the moving direction of the light-shielding part 124*d* (or the slit 124*i*). The edge sensor 124 is configured such that the length Dp of the light-receiving parts 124*e* and 124*f* in the moving direction of the slit 124*i* (or the light-shielding part) and the length Ds of the slit 124*i* in the moving direction of the slit 124*i* satisfy a condition Dp≦Ds≦2×Dp and more preferably a condition 1.5×Dp<Ds<1.8×Dp. With this configuration, the high-resolution detection range has a detection resolution that is sufficient but lower than the maximum detection resolution. This in turn makes it possible to increase the detection possible range and thereby makes it possible to achieve both a sufficiently high detection resolution and a wide detection possible range.

In the sixth variation, the edge sensor 24 includes the light-receiving parts 24*h* that output signals with output levels corresponding to the proportions of the light-shielding part 24*d* having the light-passing slits 24*i* and 24*j* in the optical paths of light emitted from the light-emitting parts 24*g*. The light-receiving parts 24*h* are arranged apart from each other in the moving direction of the slits 24*i* and 24*j* (or the light-shielding part 24*d*). The edge sensor 124 is configured such that the length Dp of the light-receiving parts 24*h* in the moving direction of the slits 24*i* and 24*j* and the length Ds of the slits 24*i* and 24*j* in their moving direction satisfy a condition Dp≦Ds≦2×Dp and more preferably a condition 1.5×Dp<Ds<1.8×Dp. Also, the center distance d1 between the light-receiving parts 24*h* in the moving direction of the slits 24*i* and 24*j* (or the light-shielding part), the center distance d2 between the slits 24*i* and 24*j* in the moving direction of the slits 24*i* and 24*j*, and the width Dp of the light-receiving parts 24*h* are configured to satisfy a condition d2−d1=Dp. Also with this configuration, the high-resolution detection range has a detection resolution that is sufficient but lower than the maximum detection resolution. This in turn makes it possible to increase the detection possible range and thereby makes it possible to achieve both a sufficiently high detection resolution and a wide detection possible range. In the fifth variation, a combined signal (Va−Vb)/(Va+Vb) of the output signals Va and Vb from the light-receiving parts 124*e* and 124*f* is used to determine the amount of belt displacement. This configuration makes it possible to improve the linearity of the detection resolution in the detection possible range and thereby makes it easier to stably perform the belt meandering preventing process.

In the seventh variation, the steering control unit 21 generates a sum signal (Va+Vb) of the output signals from the light-receiving parts 24*h*, compares the level of the sum signal (Va+Vb) with a threshold Vth and a sensor failure threshold Vthsens lower than the threshold Vth, and outputs failure information indicating sensor failure if the sum signal (Va+Vb) is less than the sensor failure threshold Vthsens. Thus, the steering control unit 21 also functions as a failure information outputting unit. This configuration makes it possible to quickly deal with sensor failure.

An aspect of the present invention makes it possible to provide a belt-meandering preventing device that can detect displacement of an endless belt in the belt width direction in a wide detection range and at a high detection resolution using multiple inexpensive sensors, and an image forming apparatus including the belt meandering preventing device.

In an embodiment of the present invention, a belt displacement detection unit includes multiple optical sensors that output signals with output levels corresponding to the proportions of a moving part in their optical paths. The moving part moves in association with the displacement of an endless belt or an edge of the endless belt in the belt width direction. The optical sensors may be implemented by inexpensive transmissive or reflective optical sensors.

In an embodiment of the present invention, output signals from the optical sensors in their detection ranges (the ranges within which the output levels vary according to the displacement of the endless belt in the belt width direction) are combined such that the rate of change of the output level of the combined signal with respect to the amount of belt displacement of the endless belt in the belt width direction (i.e., the detection resolution of the combined signal) becomes greater than the rate of change of the output levels of the respective optical sensors (i.e., the detection resolution of each output signal or each optical sensor). This configuration makes it possible to achieve a detection resolution that is higher than that provided by each optical sensor in an overlapping detection range (high-resolution detection range) where the detection ranges of the optical sensors overlap each other. In other words, an overlapping detection range of the optical sensors 24*e* and 24*f* with a relatively low detection resolution and a relatively wide detection range is used to provide a wide high-resolution detection range. This configuration makes it possible to achieve a high detection resolution that is not achievable by a single optical sensor whose detection range has the same width as that of the high-resolution detection range.

At least one of the optical sensors may be configured to output a signal with the maximum output level when the position of the endless belt in the belt width direction is beyond one end of the high-resolution detection range and to output a signal with the minimum output level when the position of the endless belt in the belt width direction is beyond the other end of the high-resolution detection range. This configuration is beneficial because of the reasons described below.

Belt meandering preventing devices disclosed in JP2008-275800 and JP2005-338522 use displacement sensors to detect the displacement of an endless belt in the belt width direction. Generally, an inexpensive displacement sensor outputs a signal with the same output level (0 V) regardless of whether an object (swing arm) moves beyond the detection range in one swinging direction or the other swinging direction. Therefore, with the related-art belt meandering preventing devices, it is not possible to determine the direction of displacement of an endless belt based on sensor outputs if the endless belt moves out of a detection range where the amount of displacement of the endless belt in the belt width direction can be detected. Therefore, with the related-art belt meandering preventing devices, when an endless belt is displaced in the belt width direction beyond the detection range, it is not possible to correct the position of the endless belt and it is necessary to stop the rotation of the endless belt and perform maintenance to manually correct the position of the endless belt in the belt width direction. Particularly, when a narrow detection range is set to obtain a necessary detection resolution, the above problem increases the frequency of maintenance.

According to the above embodiment of the present invention, even if an endless belt is displaced beyond the high-resolution detection range, it is possible to determine the direction of displacement based on the output signal of at least one of the optical sensors provided to detect the amount of displacement of the endless belt in the belt width direction in the high-resolution detection range. This in turn makes it possible to correct the position of an endless belt in the belt width direction to return the endless belt to the high-resolution detection range, instead of immediately stopping the endless belt and performing maintenance, even if the endless belt is displaced beyond the high-resolution detection range. Thus, the above embodiment makes it possible to reduce the frequency of maintenance.

The present invention is not limited to the specifically disclosed embodiments, and variations and modifications may be made without departing from the scope of the present invention.

The present application is based on Japanese Priority Application No. 2009-264549 filed on Nov. 20, 2009 and Japanese Priority Application No. 2010-131386 filed on Jun. 8, 2010, the entire contents of which are hereby incorporated herein by reference.

What is claimed is:

1. A belt meandering preventing device, comprising:

a belt displacement detection unit detecting an amount of displacement in a belt width direction of an endless belt rotatably stretched over support parts; and a belt meandering correction unit correcting the displacement in the belt width direction of the endless belt based on the amount of displacement detected by the belt displacement detection unit, wherein the belt displacement detection unit includes a moving part moving in association with the displacement of the endless belt or an edge of the endless belt in the belt width direction, and optical sensors outputting signals with output levels corresponding to proportions of the moving part in optical paths of the optical sensors;

the optical sensors are arranged such that the output levels of the optical sensors change as the endless belt is displaced in the belt width direction in a predetermined high-resolution detection range; and the belt displacement detection unit is configured to combine the output signals of the optical sensors such that a rate of change of an output level of the combined signal with respect to the amount of displacement in the belt width direction of the endless belt within the high-resolution detection range becomes greater than rates of change of the output levels of the respective optical sensors and to detect the amount of displacement based on the combined signal.

2. The belt meandering preventing device as claimed in claim 1, wherein at least one of the optical sensors is configured to output a signal with a maximum output level when a position of the endless belt in the belt width direction is beyond one end of the high-resolution detection range and to output a signal with a minimum output level when the position of the endless belt in the belt width direction is beyond another end of the high-resolution detection range.

3. The belt meandering preventing device as claimed in claim 1, wherein the optical sensors are implemented by an optical sensor unit including one light-emitting part and two light-receiving parts outputting signals with output levels corresponding to proportions of the edge of the endless belt or the moving part in optical paths of light emitted from the light-emitting part.

4. The belt meandering preventing device as claimed in claim 1, wherein the moving part has light-passing slits;

the optical sensors are implemented by two transmissive optical sensors that output signals with output levels corresponding to the proportions of the moving part shielding optical paths of the transmissive optical sensors; and the transmissive optical sensors are arranged such that when a rear edge of one of the light-passing slits, in terms of a moving direction of the moving part when the endless belt is displaced in one belt width direction in the high-resolution detection range, is substantially at a center of a light-receiving part of one of the transmissive optical sensors, a leading edge of the one of the light-passing slits or a leading edge of another one of the light-passing slits is located substantially at a center of a light-receiving part of another one of the transmissive optical sensors.

5. The belt meandering preventing device as claimed in claim 4, wherein if both of the output levels of the two transmissive optical sensors are greater than a predetermined threshold, the belt displacement detection unit uses a combined signal, which is a differential signal between the output signals of the two transmissive optical sensors, to determine the amount of belt displacement; and if one of the output levels of the two transmissive optical sensors is less than or equal to the predetermined threshold, the belt displacement detection unit uses a signal with a maximum output level of one of the two transmissive optical sensors having a higher output level to determine the amount of displacement.

6. The belt meandering preventing device as claimed in claim 4, further comprising:

an error signal outputting unit outputting an error signal indicating a sensor error if both of the output levels of the two transmissive optical sensors are less than or equal to a predetermined threshold.

7. The belt meandering preventing device as claimed in claim 4, further comprising:

a light intensity adjusting unit generating an adjustment signal that is a sum signal of the output signals of the two transmissive optical sensors when both of the output levels of the two transmissive optical sensors are greater than a predetermined threshold and adjusting light intensity of light-emitting parts of the two transmissive optical sensors based on the adjustment signal.

8. The belt meandering preventing device as claimed in claim 1, wherein the moving part has a light-passing slit;

the optical sensors are implemented by an optical sensor unit including a light-emitting part and two light-receiving parts arranged next to each other along a moving direction of the moving part and outputting signals with output levels corresponding to proportions of the moving part in optical paths of light emitted from the light-emitting part; and a length Dp of each of the two light-receiving parts in the moving direction of the moving part and a length Ds of the light-passing slit in the moving direction of the moving part are configured to satisfy a formula (1): $Dp \leqq Ds \leqq 2 \times Dp$.

9. The belt meandering preventing device as claimed in claim 1, wherein the moving part has two light-passing slits arranged along a moving direction of the moving part;

the optical sensors are implemented by an optical sensor unit including a light-emitting part and two light-receiving parts arranged apart from each other along the moving direction of the moving part and outputting signals with output levels corresponding to proportions of the moving part in optical paths of light emitted from the light-emitting part;

a length Dp of each of the two light-receiving parts in the moving direction of the moving part and a length Ds of each of the light-passing slits in the moving direction of the moving part are determined to satisfy a formula (1): $Dp \leqq Ds \leqq 2 \times Dp$; and a center distance d1 between the two light-receiving parts in the moving direction of the moving part, a center distance d2 between the two light-passing slits in the moving direction of the moving part, and the length Dp of each of the two light-receiving parts are configured to satisfy a formula (2): $d2-d1=Dp$.

10. The belt meandering preventing device as claimed in claim 8, wherein the length Dp of each of the two light-receiving parts and the length Ds of the light-passing slit are configured to satisfy a formula (2): $1.5 \times Dp < Ds < 1.8 \times Dp$.

11. The belt meandering preventing device as claimed in claim 9, wherein the length Dp of each of the two light-receiving parts and the length Ds of each of the two light-passing slits are configured to satisfy a formula (3): $1.5 \times Dp < Ds < 1.8 \times Dp$.

12. The belt meandering preventing device as claimed in claim 8, wherein when the output signals of the two light-receiving parts are Va and Vb, the belt displacement detection unit generates a combined signal $(Va-Vb)/(Va+Vb)$ and determines the amount of displacement based on the combined signal $(Va-Vb)/(Va+Vb)$.

13. The belt meandering preventing device as claimed in claim 9, wherein when the output signals of the two light-receiving parts are Va and Vb, the belt displacement detection unit generates a combined signal $(Va-Vb)/(Va+Vb)$ and determines the amount of displacement based on the combined signal $(Va-Vb)/(Va+Vb)$.

14. The belt meandering preventing device as claimed in claim 8, further comprising:

a failure information outputting unit generating a sum signal of the output signals of the two light-receiving parts, comparing a level of the sum signal with two or more different thresholds, and outputting failure information indicating failure of the optical sensor unit if the level of the sum signal is less than a lowest one of the thresholds.

15. The belt meandering preventing device as claimed in claim 9, further comprising:

a failure information outputting unit generating a sum signal of the output signals of the two light-receiving parts, comparing a level of the sum signal with two or more different thresholds, and outputting failure information indicating failure of the optical sensor unit if the level of the sum signal is less than a lowest one of the thresholds.

16. An image forming apparatus for forming an image on a recording medium, the image forming apparatus comprising:

an endless belt rotatably stretched over support parts and configured to transfer an image formed thereon to the recording medium or to convey the recording medium; and the belt meandering preventing device of claim 1 configured to correct displacement in a belt width direction of the endless belt.

* * * * *